(12) United States Patent
Aoki

(10) Patent No.: US 10,568,272 B1
(45) Date of Patent: Feb. 25, 2020

(54) CULTIVATION SYSTEM

(71) Applicant: Kaoru Aoki, Shizuoka (JP)

(72) Inventor: Kaoru Aoki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/516,458

(22) Filed: Jul. 19, 2019

(30) Foreign Application Priority Data

Jul. 31, 2018 (JP) ................. 2018-144129

(51) Int. Cl.
| | | |
|---|---|---|
| *A01G 7/04* | (2006.01) |
| *F21K 9/00* | (2016.01) |
| *F21Y 105/12* | (2016.01) |
| *F21Y 113/10* | (2016.01) |
| *F21Y 115/10* | (2016.01) |

(52) U.S. Cl.
CPC ............... *A01G 7/045* (2013.01); *F21K 9/00* (2013.01); *F21Y 2105/12* (2016.08); *F21Y 2113/10* (2016.08); *F21Y 2115/10* (2016.08)

(58) Field of Classification Search
CPC ....... A01G 7/045; F21K 9/00; F21Y 2105/12; F21Y 2113/10; F21Y 2115/10
See application file for complete search history.

(56) References Cited

U.S. PATENT DOCUMENTS

2010/0020536 A1* 1/2010 Bafetti ................ F21V 23/0457
362/231
2016/0324089 A1* 11/2016 Miyabe ................ A01C 21/005

FOREIGN PATENT DOCUMENTS

JP 2001-086860 4/2001

* cited by examiner

*Primary Examiner* — Mary Ellen Bowman
(74) *Attorney, Agent, or Firm* — Oblon, McClelland, Maier & Neustadt, L.L.P.

(57) ABSTRACT

A light-emitting apparatus of a cultivation system includes a first light source array and a second light source array adjacent to the first light source array. The first light source array includes first light sources and second light sources. The first and second light sources are arranged in a specific pattern in a predetermined direction. The second light source array includes first light sources and second light sources. The first and second light sources of the second light source array are arranged in the specific pattern in the predetermined direction such that an arrangement of colors of the first and second light sources in the second light source array is shifted from an arrangement of colors of the first and second light sources in the first light source array.

7 Claims, 19 Drawing Sheets

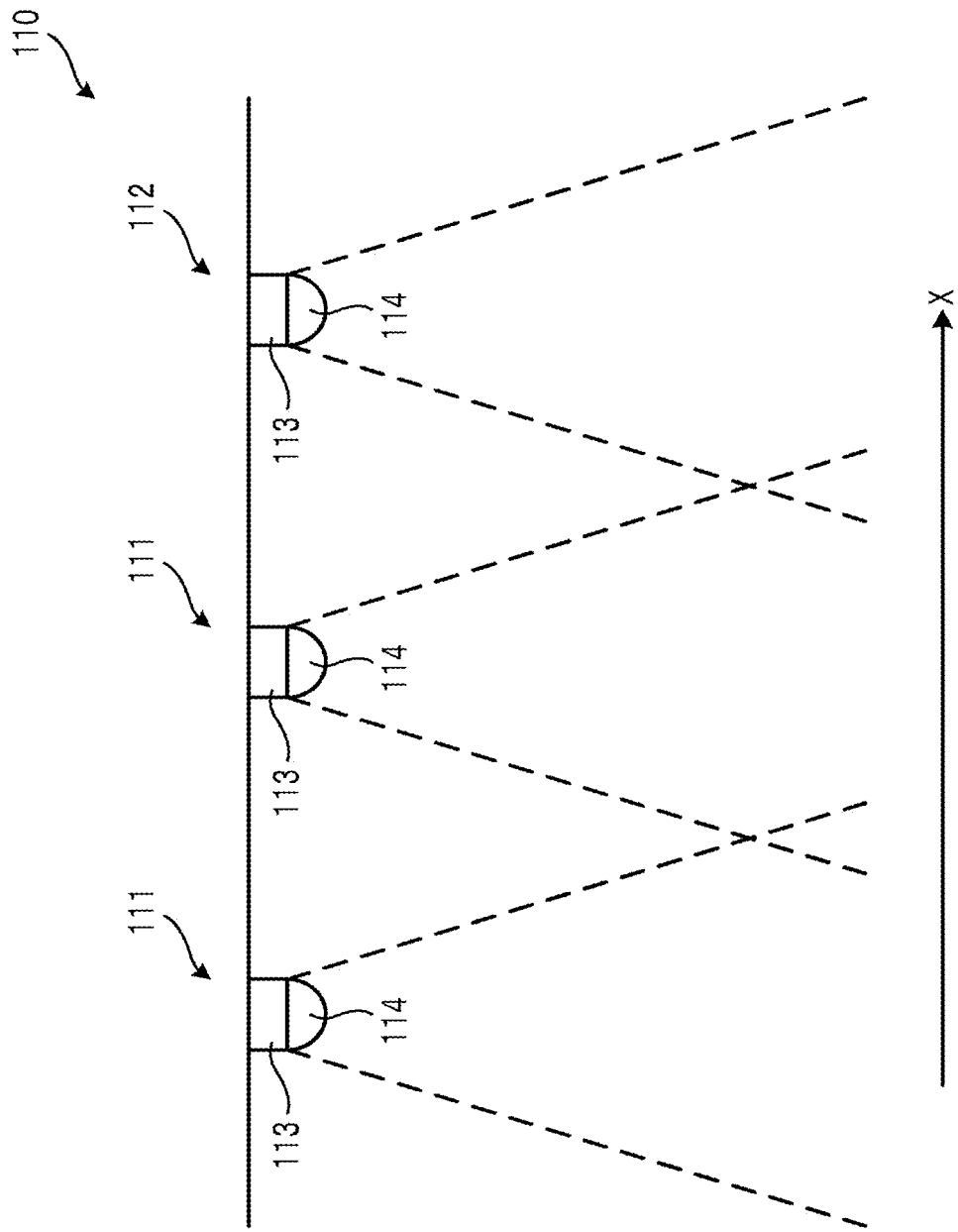

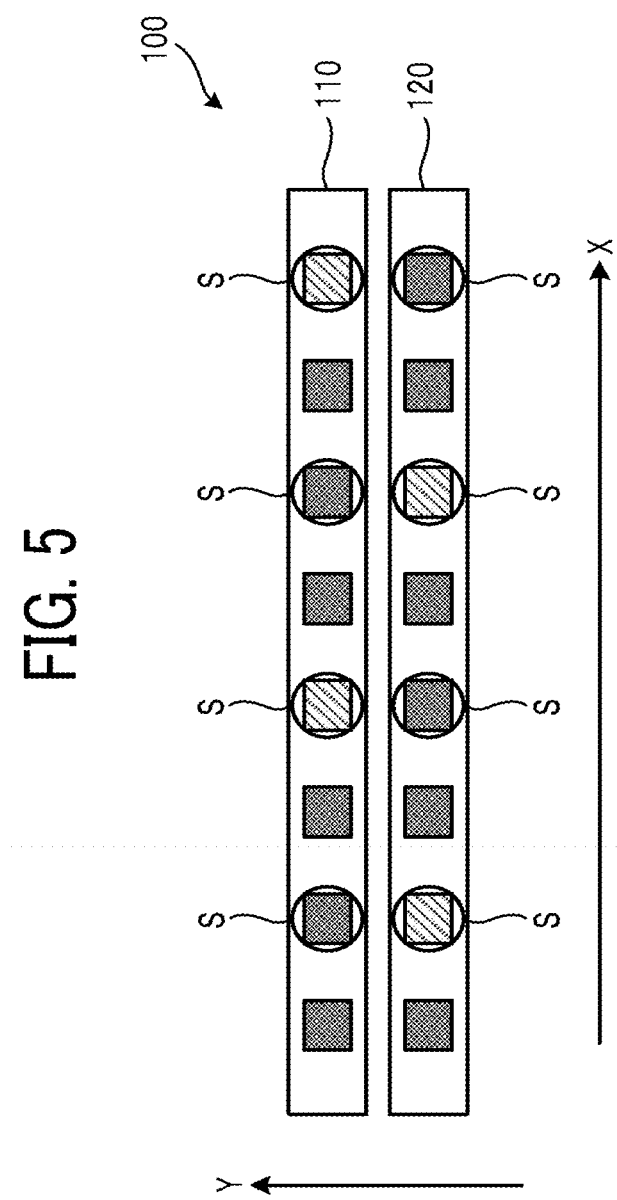

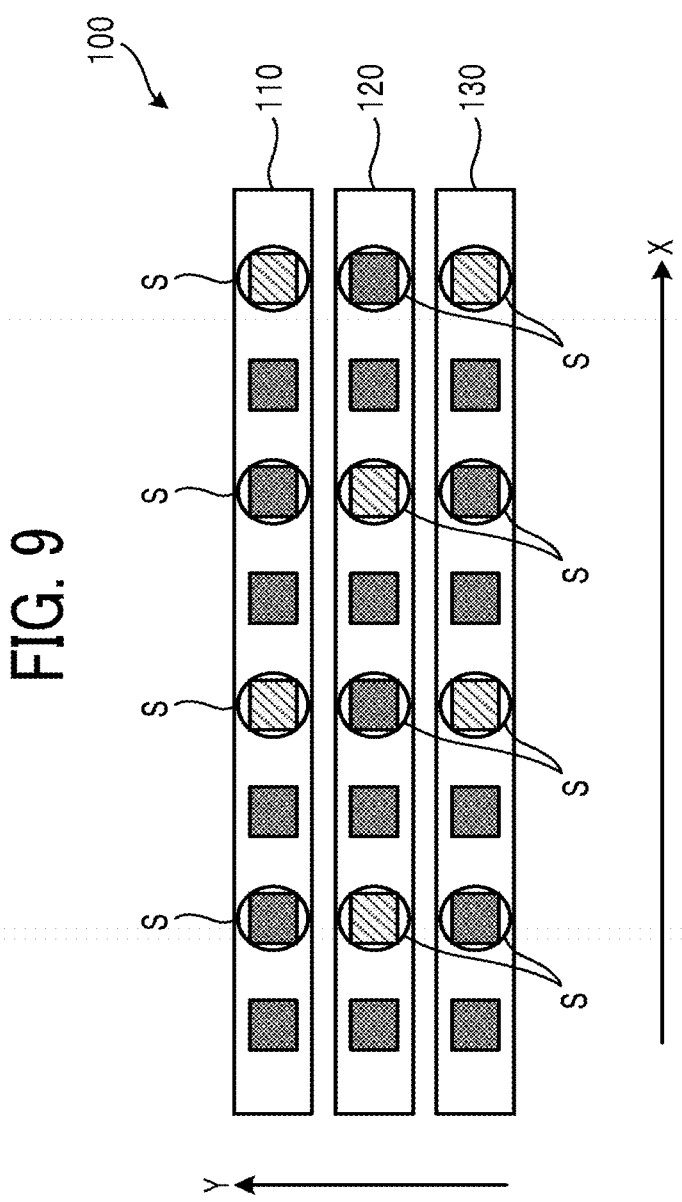

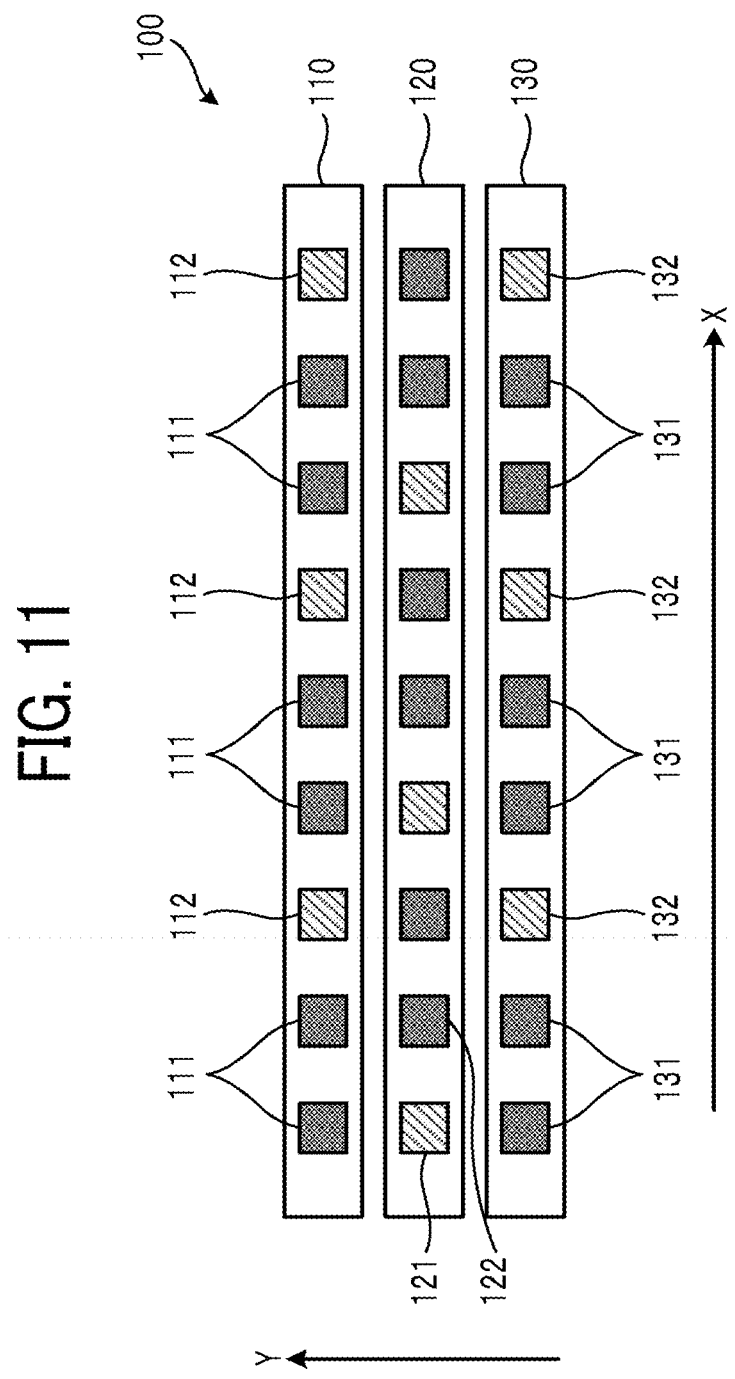

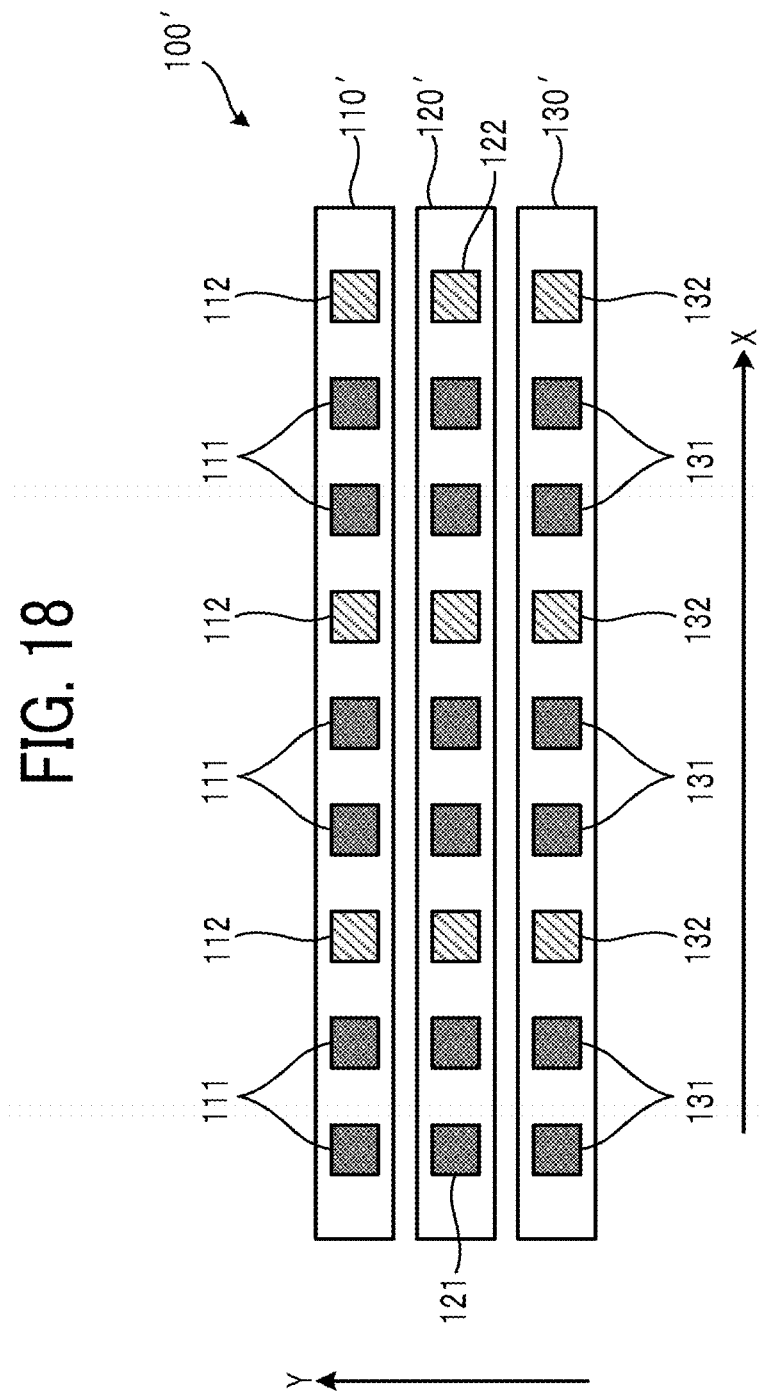

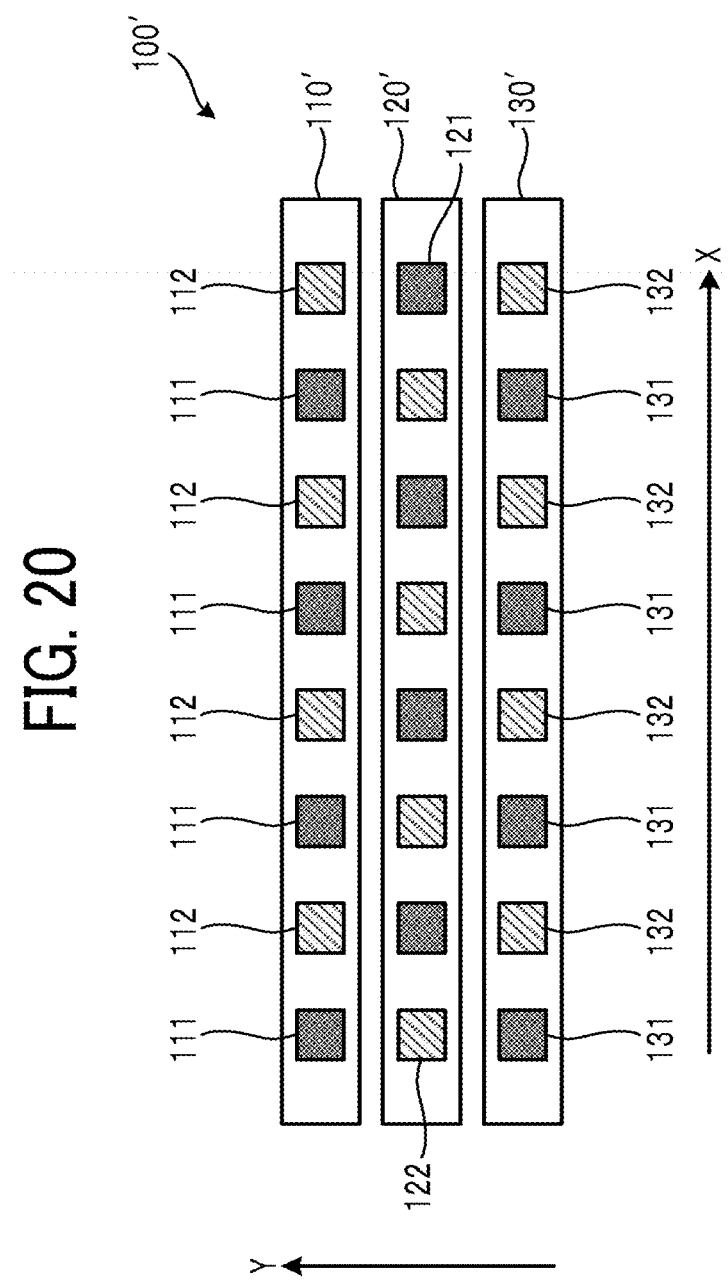

CULTIVATION SYSTEM

CROSS-REFERENCE TO RELATED APPLICATION

This patent application is based on and claims priority under 35 U.S.C. § 119(a) to Japanese Patent Application No. 2018-144129, filed on Jul. 31, 2018, the entire disclosure of which is incorporated herein by reference.

BACKGROUND

Technical Field

The present disclosure relates to a cultivation system.

Description of the Related Art

Conventionally, hydroponic cultivation is performed that cultivates plants with water or a nutrient solution. A hydroponic cultivation technology is known in which a light emitting diode (LED) is used as a light source for irradiating plants with artificial light. It is known that the combination of red and blue light is effective for the growth of plants. A light-emitting apparatus is known that includes a plurality of red and blue LEDs that are arranged in a regular pattern.

When such light-emitting apparatus including a plurality of light sources of different colors that are arranged in a regular pattern has the smaller number of blue light sources than the number of red light sources, plants are irradiated unevenly with blue light, which may cause differences in growth rates among multiple plants.

SUMMARY

Embodiments of the present disclosure describe a cultivation system including a light-emitting apparatus and an installation stand configured to accommodate a plurality of irradiation targets which are to be irradiated with light emitted from the light-emitting apparatus.

The light-emitting apparatus includes a first light source array and a second light source array adjacent to the first light source array. The first light source array includes: a plurality of first light sources, each being configured to emit light of a first color; and a plurality of second light sources, each being configured to emit light of a second color different from the first color. The plurality of first light sources and the plurality of second light sources are arranged in a specific pattern in a predetermined direction. The second light source array adjacent to the first light source array, the second light source array includes: a plurality of first light sources, each being configured to emit light of the first color; and a plurality of second light sources, each being configured to emit light of the second color different from the first color. The plurality of first light sources of the second light source array and the plurality of second light sources of the second light source array are arranged in the specific pattern in the predetermined direction such that an arrangement of colors of the plurality of first light sources and the plurality of second light sources in the second light source array is shifted from an arrangement of colors of the plurality of first light sources and the plurality of second light sources in the first light source array. The light-emitting apparatus is configured to irradiate the plurality of irradiation targets arranged along the predetermined direction near each of the first light source array and the second light source array with light emitted from the first light source array and the second light source array. The installation stand defines a plurality of installation place in which the plurality of irradiation targets are to be accommodated, respectively.

BRIEF DESCRIPTION OF THE SEVERAL VIEWS OF THE DRAWINGS

A more complete appreciation of the embodiments and many of the attendant advantages and features thereof can be readily obtained and understood from the following detailed description with reference to the accompanying drawings, wherein:

FIG. 4 is a diagram illustrating an example of a configuration of a light source of the irradiation apparatus illustrated in FIG. 3;

FIG. 5 is a diagram illustrating an example of an arrangement of irradiation targets to be irradiated by the irradiation apparatus illustrated in FIG. 3;

FIG. 9 is a diagram illustrating an example of an arrangement of irradiation targets to be irradiated by the irradiation apparatus illustrated in FIG. 8;

FIG. 11 is a plan view of the irradiation apparatus according to Example 4;

FIG. 18 is a plan view of the irradiation apparatus according to Comparative Example 4;

FIG. 20 is a diagram illustrating another variation of the irradiation apparatus, according to an embodiment of the present disclosure.

Figure 1:
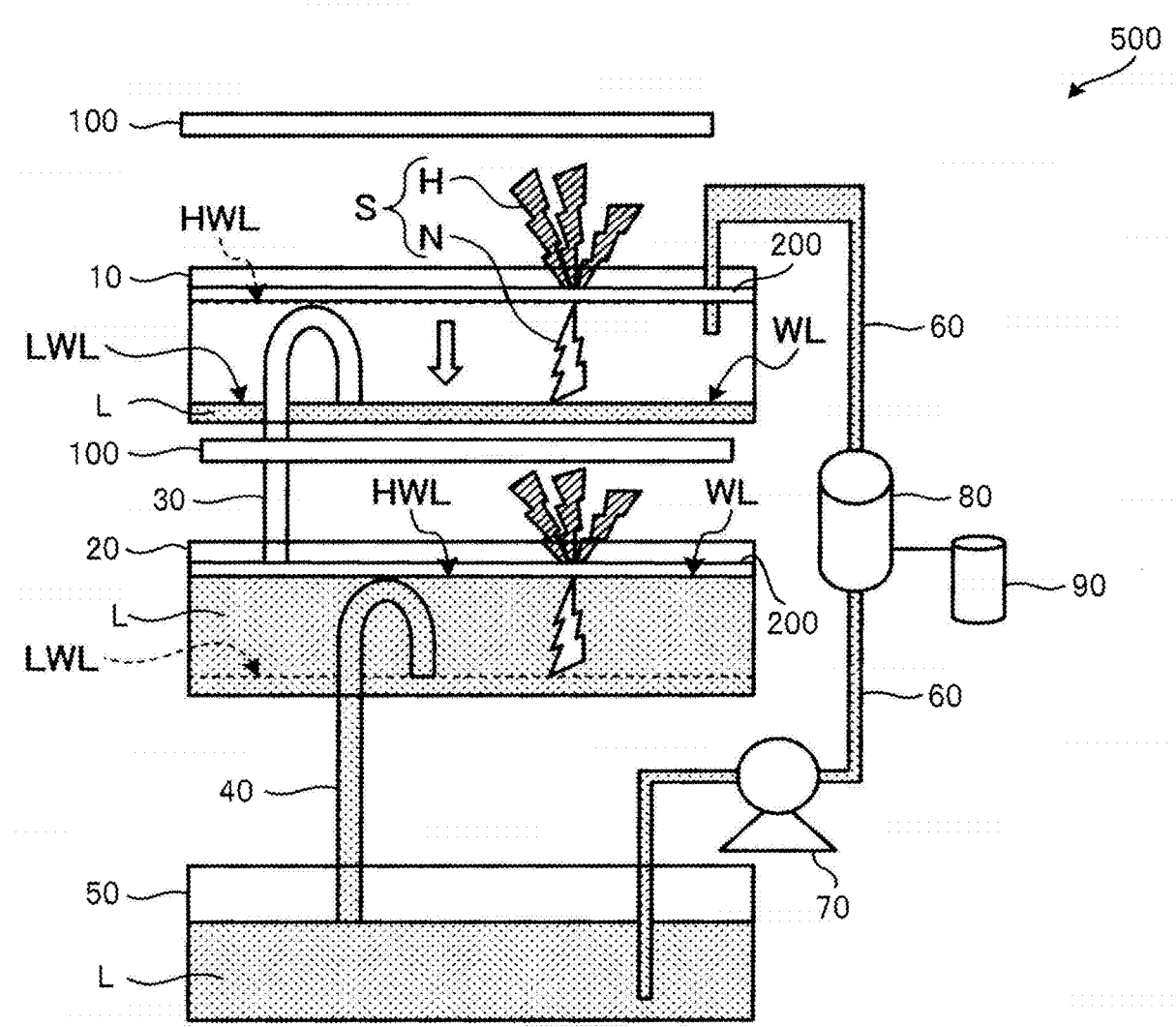
FIG. 1 is a schematic diagram illustrating an example of a hydroponic cultivation system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results. Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a diagram illustrating an example of a hydroponic cultivation system 500, which is an example of a cultivation system, according to the present disclosure.

As illustrated in FIG. 1, the hydroponic cultivation system 500 includes a cultivation tank 10 and a cultivation tank 20. The cultivation tank 20 is disposed in the lower side of the hydroponic cultivation system 500 compared to the cultivation tank 10. The cultivation tank 10 and the cultivation tank 20 have the same capacity and are connected with each other via a siphon 30. Each of the cultivation tank 10 and the cultivation tank 20 is configured to store nutrient solution L in the lower part in the tank. In the present embodiment, a liquid containing water as the main component and further containing nutrient is used as the nutrient solution L. However, such liquid is just one example of the nutrient solution L. Alternatively, the nutrient solution can be water or any other suitable liquid that contains water as a component other than the main component.

Each of the cultivation tank 10 and the cultivation tank 20 includes an installation tray 200 for a plant or plants S grown with the nutrient solution L. The installation tray is an example of an installation stand. The installation tray 200 is arranged in the upper part of each of the cultivation tank 10 and the cultivation tank 20. The plant S is a plant having leaves H and roots N. In the present embodiment, it is assumed that the plant S is leaf vegetables such as lettuce and spinach. Although FIG. 1 illustrates a case where one plant S is accommodated in the installation tray 200, in fact, a plurality of plants S are accommodated in the installation tray 200.

Figure 2:
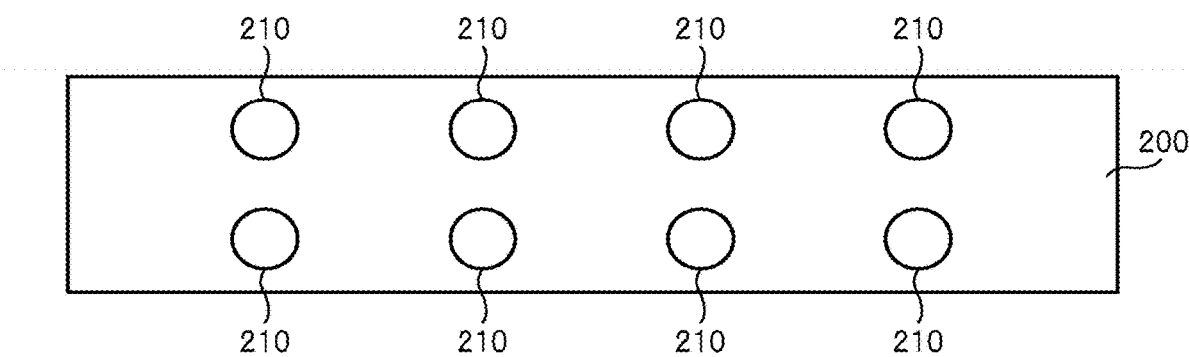
FIG. 2 is a plan view illustrating an example of an installation stand of the cultivation system illustrated in FIG. 1.

As illustrated in FIG. 2, the installation tray 200 defines a plurality of holes 210, each being an installation place where the plants S is accommodated. In other words, the installation tray 200 includes the plurality of holes 210 corresponding to the plurality of plants S, respectively. The plant S is accommodated in the cultivation tank 10 and the cultivation tank 20 by inserting the roots N into the hole 210. Although in the present embodiment the drawing illustrates a case in which eight holes 210 are provided in the installation tray 200, this is just an example. Any suitable number of the holes 210 can be provided according to the growth stage of the plant S, the type of the plant S, and the size of each of the cultivation tank 10 and the cultivation tank 20.

The hydroponic cultivation system 500 further includes a reservoir 50 configured to store the nutrient solution L. The reservoir 50 is provided below the cultivation tank 20 and connected to the cultivation tank 20 via a siphon 40.

The reservoir 50 is further connected to the cultivation tank 10 via a circulation pipe 60. A nutrient solution pump 70 and a bubble generator 80 are provided in the middle of the circulation pipe 60. By operating the nutrient solution pump 70, the nutrient solution L in the reservoir 50 is supplied to the cultivation tank 10 through the circulation pipe 60.

The bubble generator 80 is provided downstream from the nutrient solution pump 70 in the nutrient solution flowing direction. The bubble generator 80 receives a supply of gas from a gas tank 90 and generates bubbles in the nutrient solution L. As a bubble generation system, a cavitation system or a pressure dissolution system is used, for example.

The hydroponic cultivation system 500 further includes two plant irradiation apparatuses 100 that are provided above the cultivation tank 10 and the cultivation tank 20, respectively. The plant irradiation apparatuses 100 emit light onto the entire top surfaces of the cultivation tank 10 and the cultivation tank 20, respectively. The plant irradiation apparatus 100 is an example of a light-emitting apparatus.

The siphon 30 is a pipe curved in an inverted J shape when viewed from the side. The siphon 30 includes a water intake and a drain outlet at both ends. The water intake is provided at a lower limit water level LWL that is set near the bottom of the cultivation tank 10. For example, the water intake is provided at the same level as the lower end of the roots N. The drain outlet is provided inside the cultivation tank 20. The top of the siphon 30 is located at an upper limit water level HWL that is set at the height of the boundary between the leaf H and the roots N of the plant S.

The siphon 40 is provided in substantially the same manner as the siphon 30. In other words, a water intake of the siphon 40 is provided at a lower limit water level LWL that is set near the bottom of the cultivation tank 20. A drain outlet of the siphon 40 is provided inside the reservoir 50. The top of the siphon 40 is located at an upper limit water level HWL that is set at the height of the boundary between the leaf H and the roots N of the plant S.

In the hydroponic cultivation system 500, the siphon 30 and the siphon 40 are alternately filled with the nutrient solution L by turning on and off the nutrient solution pump 70 at a predetermined timing. Further, the nutrient solution L is drained by siphoning from the siphon 30 and the siphon 40 alternately. Accordingly, the water levels WL of the nutrient solution L in the cultivation tank 10 and the cultivation tank 20 are alternately raised and lowered. When the water level WL is raised and lowered between the upper limit water level HWL and the lower limit water level LWL in each of the cultivation tank 10 and the cultivation tank 20, a state in which the roots N of the plant S are immersed in the nutrient solution L and another state in which the roots N are exposed above the nutrient solution L are repeated. In the present embodiment, the time period during which the roots N of the plant S are exposed above the nutrient solution L is set to be longer than the time period during which the roots N are immersed in the nutrient solution L.

A detailed description is now given of the above-described operation procedure. As illustrated in FIG. 1, when the water level WL of the nutrient solution L in the cultivation tank 10 reaches the lower limit water level LWL, automatic drainage from the cultivation tank 10 to the cultivation tank 20 through the siphon 30 is stopped. On the other hand, when the water level WL of the nutrient solution L in the cultivation tank 20 reaches the upper limit water level HWL, the siphon 40 is filled with the nutrient solution L and automatic drainage by siphoning is started. Thus, the nutrient solution L in the cultivation tank 20 is drained to the reservoir 50 through the siphon 40.

At the time when the automatic drainage from the siphon 30 is stopped, or after the automatic drainage from the siphon 30 is stopped, the nutrient solution pump 70 is turned on and operated. Supply of the nutrient solution L from the reservoir 50 to cultivation tank 10 is started through the circulation pipe 60, thereby causing the water level WL of cultivation tank 10 to rise. Bubbles generated by the bubble generator 80, such as micro bubbles or ultra-fine bubbles are mixed in the nutrient solution L.

On the other hand, the water level WL of the cultivation tank 20 falls by the automatic drainage through the siphon 40. When the water level WL of the cultivation tank 20 reaches the lower limit water level LWL, the siphoning is stopped, and the automatic drainage from the cultivation tank 20 to the reservoir 50 is stopped.

When the water level WL of the cultivation tank 10 reaches the upper limit water level HWL, the siphon 30 is filled with the nutrient solution L and accordingly, automatic drainage by siphoning is started. Thus, the nutrient solution L in the cultivation tank 10 is drained to the cultivation tank 20 through the siphon 30. At the time when the automatic drainage by the siphon 30 is stopped or after the automatic drainage by the siphon 30 is stopped, the nutrient solution pump 70 is turned off to stop the operation. Thus, the supply of the nutrient solution L from the circulation pipe 60 to the cultivation tank 10 is stopped. By repeatedly turning the nutrient solution pump 70 on and off as described in the above procedure, the water level WL of the nutrient solution L in the cultivation tank 10 and the cultivation tank 20 is alternately raised and lowered between the upper limit water level HWL and the lower limit water level LWL.

Figure 3:
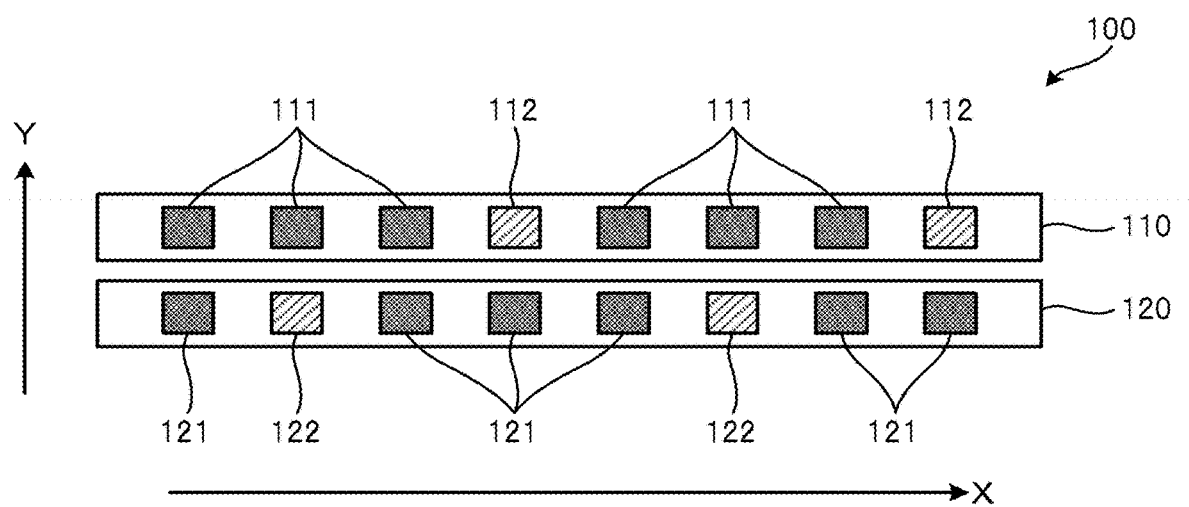
FIG. 3 is a plan view illustrating an irradiation apparatus of the cultivation system illustrated in FIG. 1, according to Example 1.

FIG. 3 is an illustration of Example 1 of the plant irradiation apparatuses 100. As illustrated in FIG. 3, each plant irradiation apparatus 100 includes a first light source array 110 and a second light source array 120. The first light source array 110 extends along a predetermined direction, e.g., an X direction. The second light source array 120 is provided side by side with the first light source array 110 in a Y direction, which is a direction intersecting with the X direction. It is preferable that the X direction and the Y direction are orthogonal to each other.

The first light source array 110 includes a plurality of light emitters 111. The plurality of light emitters 111 is an example of a plurality of first light sources, each being configured to emit light of a first color. The first light source array 110 further includes a plurality of light emitters 112. The plurality of light emitters 112 is an example of a plurality of second light sources, each being configured to emit light of a second color different from the first color. The light emitter 111 is an LED that emits light of a red color, which is an example of the first color. The light emitter 112 is an LED that emits light of a blue color, which is an example of the second color. As illustrated in FIG. 4, each of the light emitter 111 and the light emitter 112 is constituted as an LED chip 113 whose light emitting surface is covered with a transparent resin 114 having a dome shape to provide good directivity.

A pigment called chlorophyll is used in photosynthesis by the plant S. Chlorophyll has a characteristic of absorbing light in a red wavelength range having a peak around 660 nm and light in a blue wavelength range having a peak around 450 nm. In other words, both red light and blue light are effective for the growth of the plant S. Red light in particular has the largest effect on photosynthesis, and is particularly necessary for photosynthesis. It is known that blue light is required to make the plant S strong and to increase the nutrient content of the plant S. In other words, blue light is light necessary for photomorphogenesis.

Since the wavelengths of general-purpose red and blue LEDs are almost the same as the peak of photosynthesis, general-purpose LEDs are used as the light emitter 111 and the light emitter 112 in the present embodiment.

As described above, since red light and blue light play different roles from each other, it is required that the plant S be irradiated with red light and blue light in a well-balanced manner. The optimum ratio of light intensity between red light and blue light varies depending on the type of the plant S and the growth stage of the plant S. However, from the viewpoint of healthy growth of the plant S, it is preferable that the plant S be irradiated with red light in amounts greater than that of blue light.

As illustrated in FIG. 3, in the present Example 1, the number of light emitters 111 is larger than the number of light emitters 112 in the first light source array 110. In other words, the number of light emitters 112 is smaller than the number of light emitters 111. Further, in the present Example 1, the light emitters 111 and the light emitters 112 are arranged in the X direction in a repeating pattern in which three continuous light emitters 111 alternate with one light emitter 112.

In substantially the same manner as the first light source array 110, the second light source array 120 includes a plurality of light emitters 121. The plurality of light emitters 121 is an example of the plurality of first light sources, each being configured to emit light of a first color. The second light source array 120 further includes a plurality of light emitters 122. The plurality of light emitters 122 is an example of the plurality of second light sources, each being configured to emit light of a second color, which is different from the first color. The light emitter 121 is an LED that emits light of a red color, which is an example of the first color. The light emitter 122 is an LED that emits light of a blue color, which is an example of the second color.

The light emitter 121 and the light emitter 122 have the same or substantially the same configurations as those of the light emitter 111 and the light emitter 112, which are described above with reference to FIG. 4.

In the present Example 1, in the second light source array 120, the light emitters 121 and the light emitters 122 are arranged in the X direction in a repeating pattern in which three continuous light emitters 121 alternate with one light emitter 122. In addition, as illustrated in FIG. 3, the light emitters 121 and the light emitters 122 in the second light source array 120 are shifted from the corresponding light emitters in the first light source array 110.

When the plants S are accommodated in the cultivation tank 10 and the cultivation tank 20 by using the installation tray 200 illustrated in FIG. 2, the plants S as an example of a plurality of irradiation targets are arranged along the X direction in the vicinity of the first light source array 110 and the second light source array 120, as illustrated in FIG. 5. More specifically, in the present Example 1, the plants S are arranged along the X direction below the first light source array 110 and the second light source array 120, respectively.

Figure 6A:
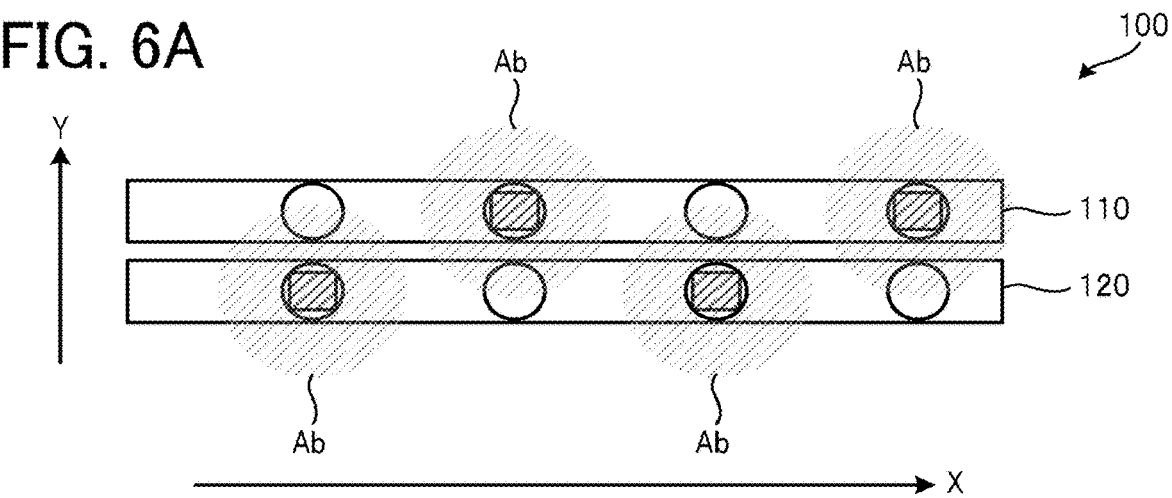
FIG. 6A to FIG. 6C are diagrams illustrating an example of irradiated areas irradiated by the irradiation apparatus illustrated in FIG. 3.
Figure 6B:
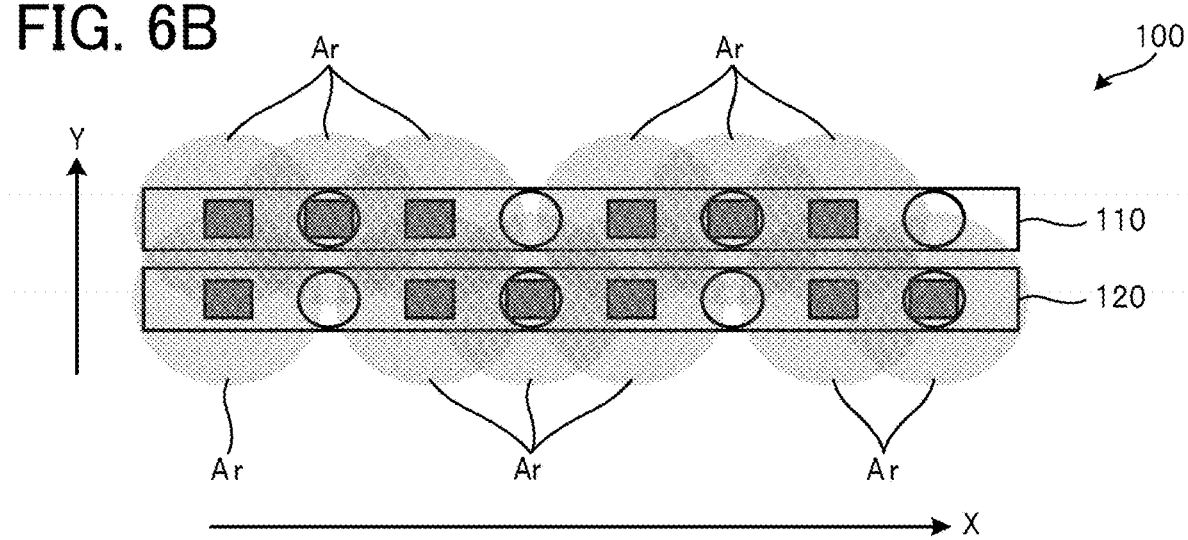
Figure 6C:
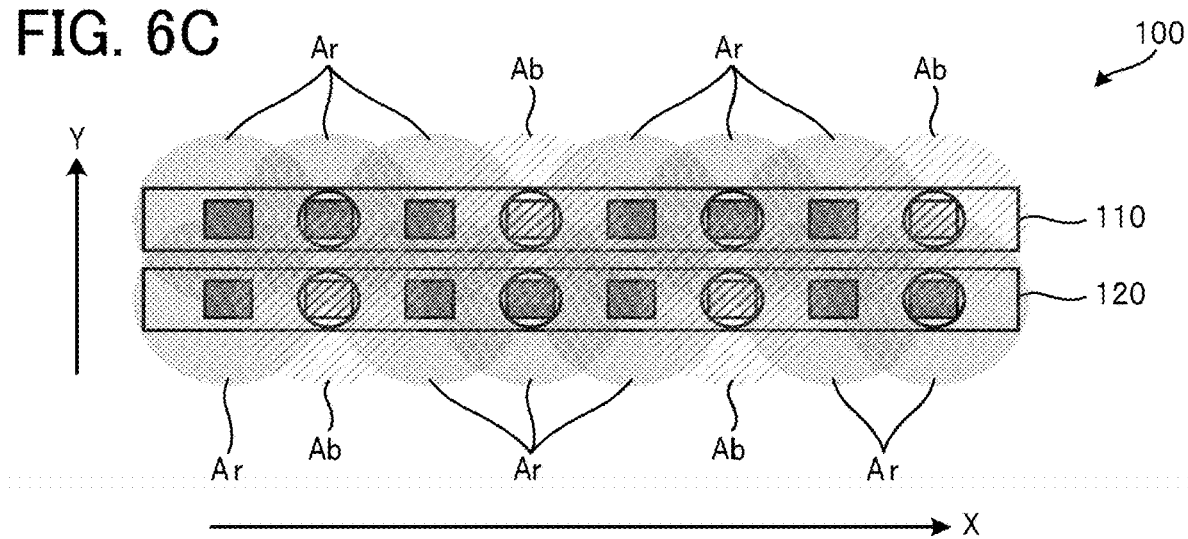

FIG. 6A illustrates irradiated areas Ab(s), when the light emitters 112 and the light emitters 122, each being configured to emit blue light, are turned on. FIG. 6B illustrates irradiated areas Ar(s), when the light emitters 111 and the light emitters 121, each being configured to emit red light, are turned on. FIG. 6C illustrates irradiated areas Ab(s) and Ar(s), when all the light emitters are turned on.

As illustrated in FIG. 6C, since the red light emitters and the blue light emitters are arranged such that a pattern of irradiation including three red light emitters alternating with one blue light emitter is repeated, the hue of light in any given irradiated area also varies in terms of the amount of red light and blue light along the X direction in a regular pattern, i.e., in the ratio of 3:1 red light to blue light. Further, since the number of red light emitters is larger than the number of blue light emitters, the red color component is greater than the blue color component in the hue of light in the irradiated area.

The first light source array 110 and the second light source array 120 have a common feature that a pattern including three continuous red light emitters alternating with one blue light emitters is repeated. However, since the light emitters in the first light source array 110 and the light emitters in the second light source array 120 are arranged so that the colors in the first light source array 110 and the second light source array 120 are shifted from each other in the X direction, the hue of light in the irradiated areas irradiated with light emitted from the first light source array 110 and the hue of light in the irradiated areas irradiated with light emitted from the second light source array 120 are also shifted from each other in the X direction. For this reason, the plants S are irradiated with light including a mix of colors, thus reducing variation in the growth rate of the plants S (and thus also the growth state of the plants S at any given time).

As illustrated in FIG. 6C, irradiated areas irradiated with light from the light emitters that are adjacent with each other in the Y direction overlap the plant S. In other words, the plurality of plants S are irradiated with light emitted from the first light source array 110 and the second light source array 120.

Thus, the plurality of plants S provided below the first light source array 110 are irradiated with light emitted not only from the first light source array 110 but also from the second light source array 120. In substantially the same manner, the plurality of plants S provided below the second light source array 120 are irradiated with light emitted not only from the second light source array 120 but also from the first light source array 110. Thus, the plants S arranged in the X direction are irradiated evenly with light, thus further reducing variations in the growth state of the plants S in the X direction.

Although in the present Example 1 the plurality of plants S is arranged below the first light source array 110 and the second light source array 120 along the X direction, the plants S can be arranged in any suitable position other than below the light source arrays, provided that the plants S are irradiated with light emitted from the first light source array 110 and the second light source array 120.

Figure 7:
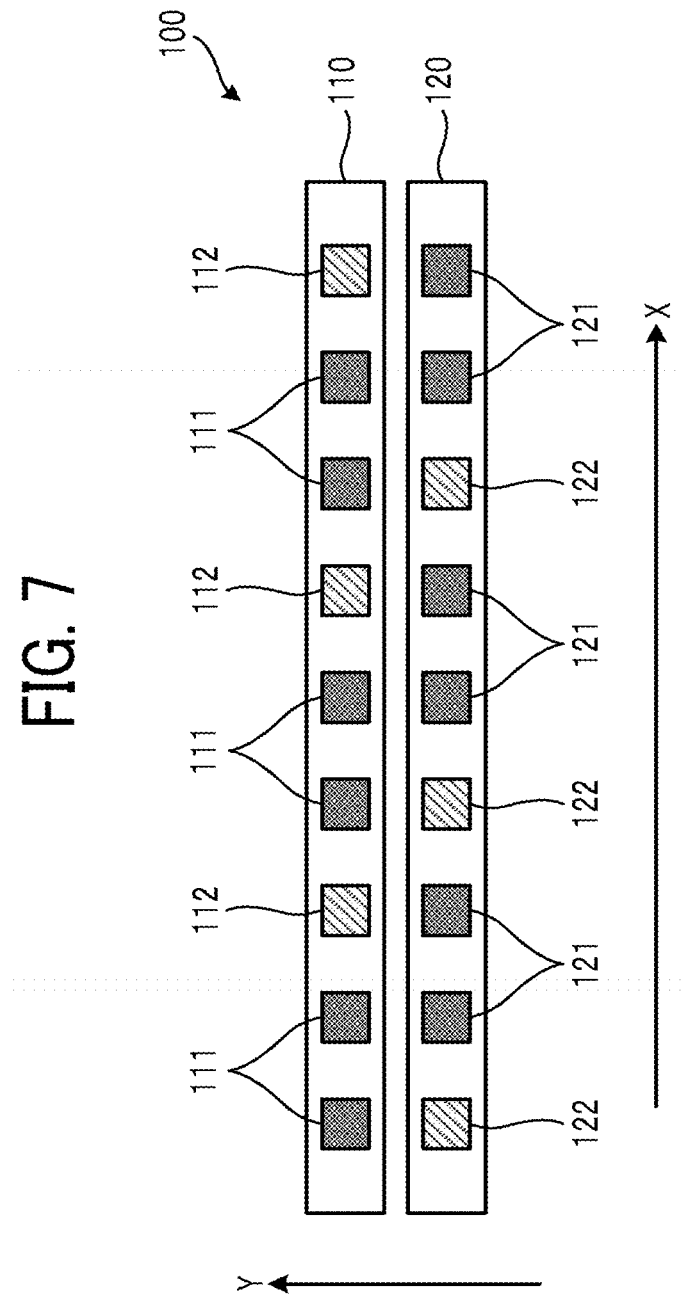
FIG. 7 is a plan view of the irradiation apparatus according to Example 2.

In the present Example 1, the red light emitters and the blue light emitters are arranged in a repeating pattern of three red light emitters alternating with one blue light emitter. Alternatively, as in Example 2 illustrated in FIG. 7, the red light emitters and the blue light emitters can be arranged in a repeating pattern of two red light emitters alternating with one blue light emitter. The red light emitters and the blue light emitters can be configured to be removable from the plant irradiation apparatuses 100. This configuration makes it easy to rearrange the red light emitters and the blue light emitters. Accordingly, the plants S are irradiated with light suitable for the particular plants S.

Figure 8:
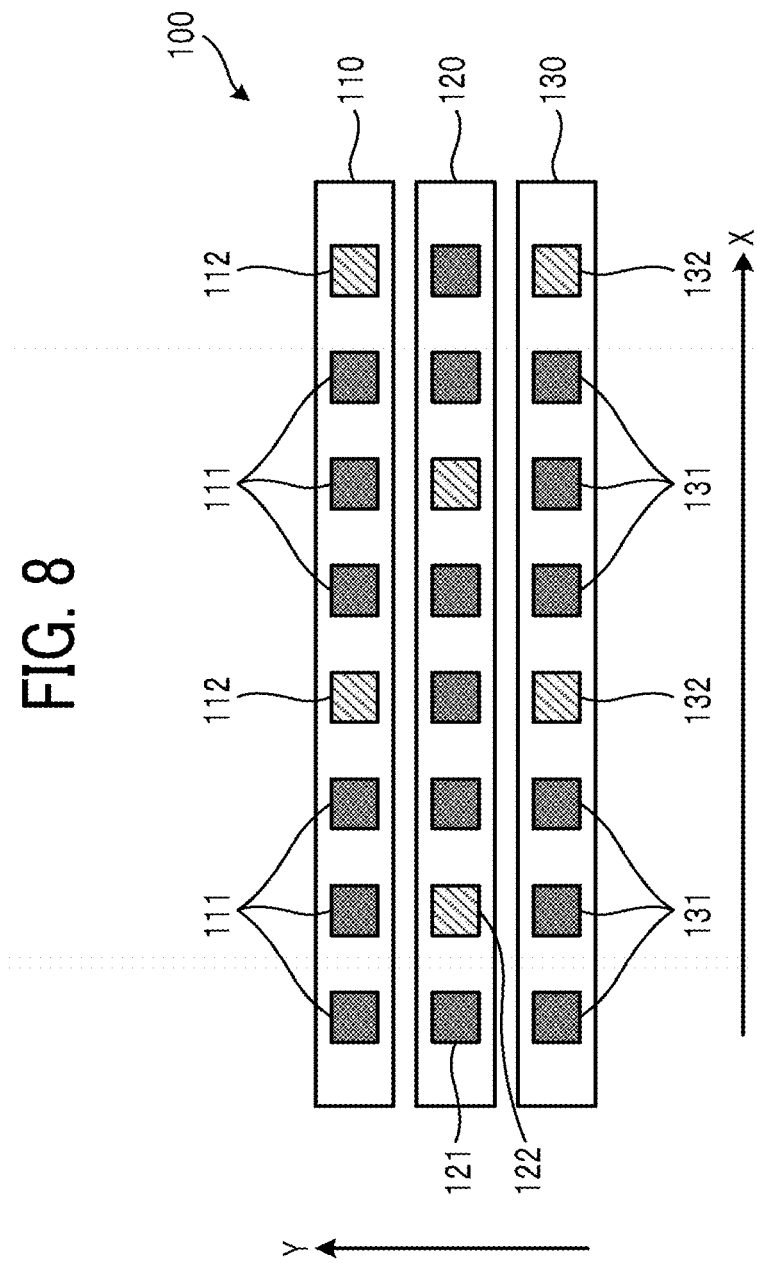
FIG. 8 is a plan view of the irradiation apparatus according to Example 3.

FIG. 8 is an illustration of Example 3 of the plant irradiation apparatuses 100, according to an embodiment of the present disclosure. As illustrated in FIG. 8, the plant irradiation apparatuses 100 of Example 3 includes a third light source array 130, in addition to the first light source array 110 and the second light source array 120. The third light source array 130 is arranged such that the second light source array 120 is interposed between the first light source array 110 and the third light source array 130 in the Y direction.

The third light source array 130 includes a plurality of light emitters 131. The plurality of light emitters 131 is an example of a plurality of first light sources, each being configured to emit light of a first color. The third light source array 130 further includes a plurality of light emitters 132. The plurality of light emitters 132 is an example of the plurality of second light sources, each being configured to emit light of a second color, which different from the first color.

The light emitter 131 is an LED that emits light of a red color, which is an example of the first color. The light emitter 132 is an LED that emits light of a blue color, which is an example of the second color. The light emitter 131 and the light emitter 132 have the same or substantially the same configurations as those of the light emitter 111 and the light emitter 112, which are described above with reference to FIG. 4.

In the present Example 3, in the third light source array 130, the light emitters 131 and the light emitters 132 are arranged in the X direction such that a pattern including three continuous light emitters 131 alternating with one light emitter 132 is repeated. As illustrated in FIG. 8, the arrangement of the colors of the light emitters in the X direction of the third light source array 130 is the same as that of the first light source array 110.

As illustrated in FIG. 9, a plurality of plants S are provided along the X direction below each of the first light source array 110, the second light source array 120, and the third light source array 130.

Figure 10A:
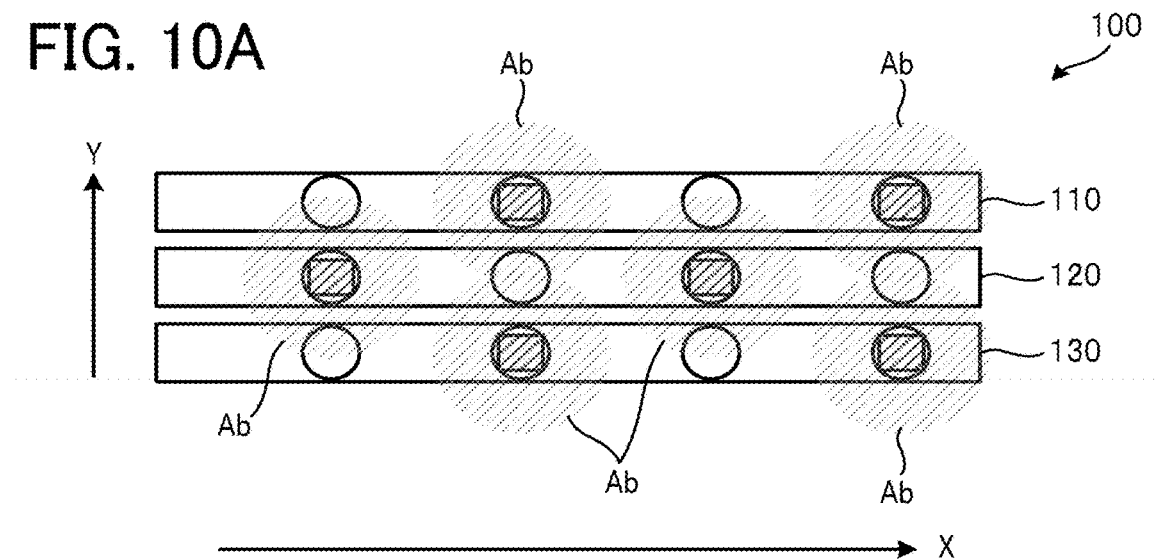
FIG. 10A to FIG. 10C are diagrams illustrating an example of irradiated areas irradiated by the irradiation apparatus illustrated in FIG. 8.
Figure 10B:
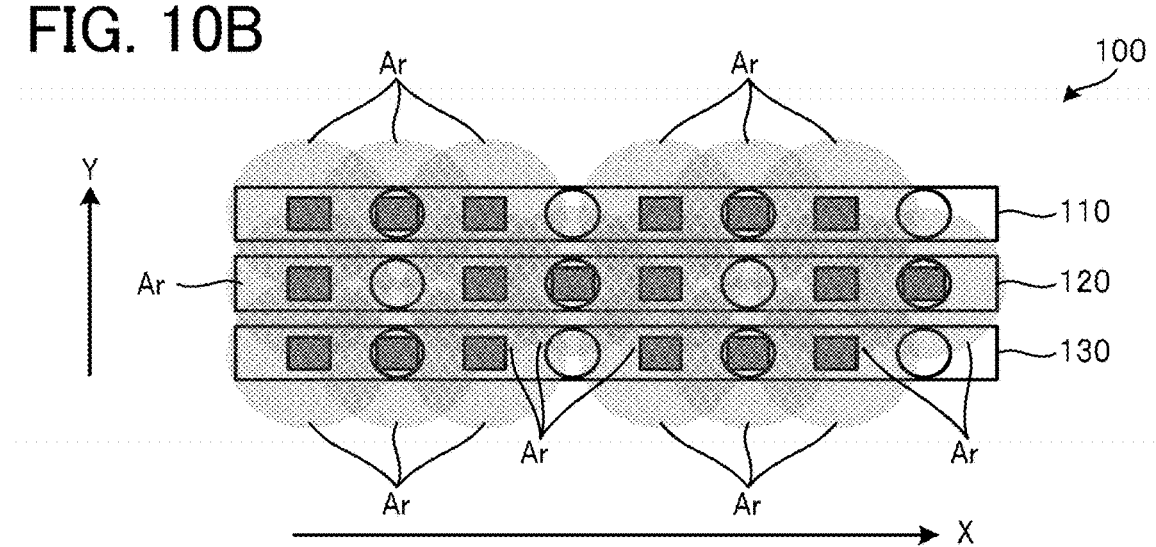
Figure 10C:
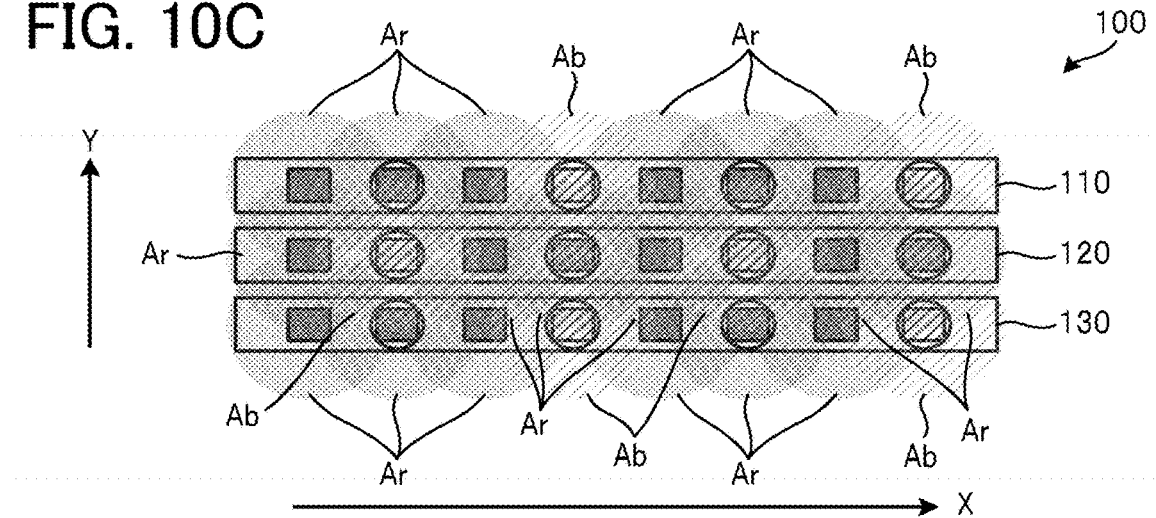

FIG. 10A illustrates irradiated areas Ab(s), when the light emitters 112, the light emitters 122, and the light emitters 132, each being configured to emit blue light, are turned on. FIG. 10B illustrates irradiated areas Ar(s), when the light emitters 111, the light emitters 121, and the light emitters 131, each being configured to emit red light, are turned on. FIG. 10C illustrates irradiated areas Ab(s) and Ar (s) when all the light emitters are turned on.

As illustrated in FIG. 10C, since the arrangement of the colors of the light emitters in the X direction of the third light source array 130 is the same as that of the first light source array 110, the hue of light in the irradiated areas irradiated with light emitted from the first light source array 110 is same as the hue of light in the irradiated areas irradiated with light emitted from the third light source array 130. In other words, the hue of color in the irradiated areas irradiated with light emitted from the third light source array 130 and the hue of color in the irradiated areas irradiated with light emitted from the second light source array 120, which is adjacent to the third light source array 130, are shifted from each other in the X direction. For this reason, the plants S are irradiated with light of a plurality of colors mixed, thus reducing the variation in the growth state of the plants S.

In addition, the plurality of plants S provided below the second light source array 120 are irradiated with light emitted not only from the first light source array 110 and the second light source array 120 but also from the third light source array 130. Thus, the plants S arranged in the X direction are irradiated more evenly with light, thus further reducing variations in the growth state of the plants S in the X direction.

In the present Example 3, the red light emitters and the blue light emitters are arranged such that a pattern including three continuous red light emitters alternating with one blue light emitter is repeated. Alternatively, as in Example 4 illustrated in FIG. 11, the red light emitters and the blue light emitters are arranged such that a pattern including two continuous red light emitters alternating with one blue light emitter is repeated.

adjustment unit is provided is adopted, the term "a plurality of light sources" refers to a plurality of light emitters and color adjustment units corresponding to the light emitters.

Table 1 represents the results of experiments performed to verify the effects of the present embodiment. In the experiment, hydroponic cultivation of vegetables is performed for 30 days by using the hydroponic cultivation system 500 after raising the seedlings. In Table 1, Examples 1 to 4 represent the results of hydroponic cultivation performed by using the plant irradiation apparatus 100 of Examples 1 to 4 described above.

TABLE 1

| | First Light Source Array (Number of LEDs) | | Second Light Source Array (Number of LEDs) | | Third Light Source Array (Number of LEDs) | | Color Shift | Average Photon Amount of One Vegetable Head ($\mu mol/m^2 \cdot s$) | | Photon Amount Variation of One Vegetable Head ($\mu mol/m^2 \cdot s$) | | Vegetables | | |
|---|---|---|---|---|---|---|---|---|---|---|---|---|---|---|
| | Blue | Red | Blue | Red | Blue | Red | | Blue | Red | Blue | Red | Number of Plants | Average Weight Ratio | Weight Variation |
| Comparative Example 1 | 2 | 6 | 2 | 6 | — | — | No Color Shift | $a_1$ | $c_1$ | $e_1$ | $g_1$ | 8 | 0.78 | Large |
| Example 1 | 2 | 6 | 2 | 6 | — | — | Present | $b_1$ | $d_1$ | $f_1$ | $h_1$ | 8 | 0.98 | Small |
| Comparative Example 2 | 3 | 6 | 3 | 6 | — | — | No Color Shift | $a_2$ | $c_2$ | $e_2$ | $g_2$ | 8 | 0.69 | Large |
| Example 2 | 3 | 6 | 3 | 6 | — | — | Present | $b_2$ | $d_2$ | $f_2$ | $h_2$ | 8 | 0.96 | Small |
| Comparative Example 3 | 2 | 6 | 2 | 6 | 2 | 6 | No Color Shift | $a_3$ | $c_3$ | $e_3$ | $g_3$ | 12 | 0.84 | Large |
| Example 3 | 2 | 6 | 2 | 6 | 2 | 6 | Present | $b_3$ | $d_3$ | $f_3$ | $h_3$ | 12 | 1 | Small |
| Comparative Example 4 | 3 | 6 | 3 | 6 | 3 | 6 | No Color Shift | $a_4$ | $c_4$ | $e_4$ | $g_4$ | 12 | 0.8 | Large |
| Example 4 | 3 | 6 | 3 | 6 | 3 | 6 | Present | $b_4$ | $d_4$ | $f_4$ | $h_4$ | 12 | 0.94 | Small |
| Comparative Example 5 | 6 | 2 | 6 | 2 | 6 | 2 | Present | $a_5$ | $c_5$ | $e_5$ | $g_5$ | 12 | 0.73 | Large |

Figure 12:
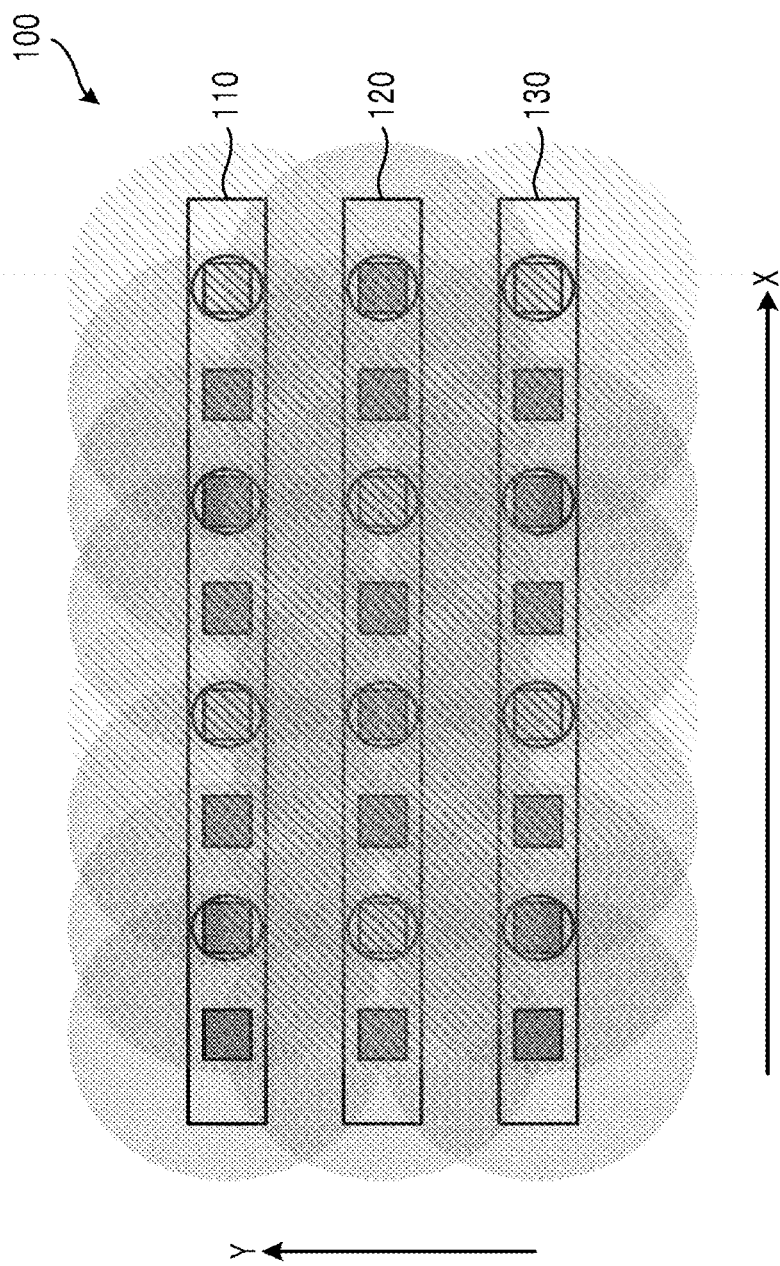
FIG. 12 is a diagram illustrating a variation of the irradiation apparatus, according to an embodiment of the present disclosure.

When the distance between the light source arrays is longer than that of the present Example 3, it is preferable to use light emitters having a wide irradiation range so that the irradiated areas of adjacent light emitters in the Y direction overlap the plant S as illustrated in FIG. 12.

Figure 13A:
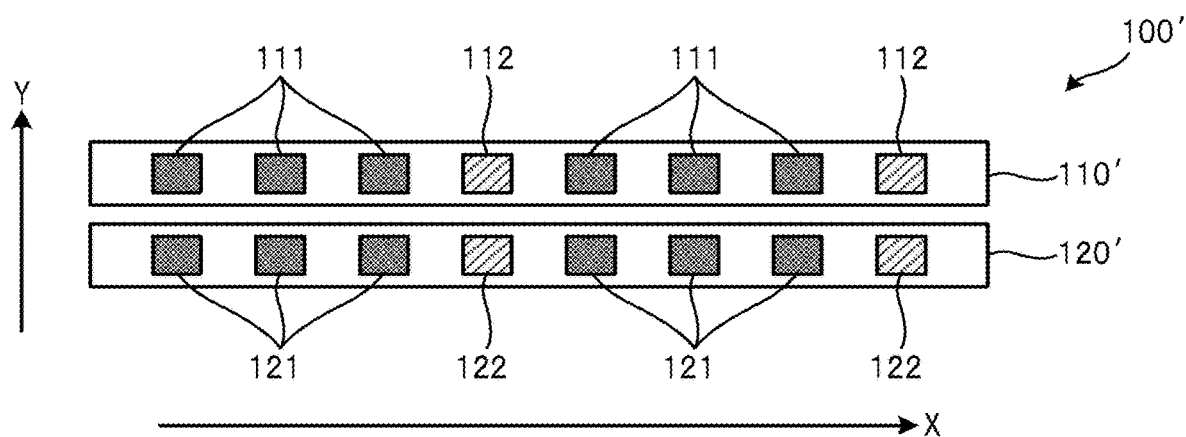
FIG. 13A and FIG. 13B are plan views of the irradiation apparatus according to Comparative Example 1.
Figure 13B:
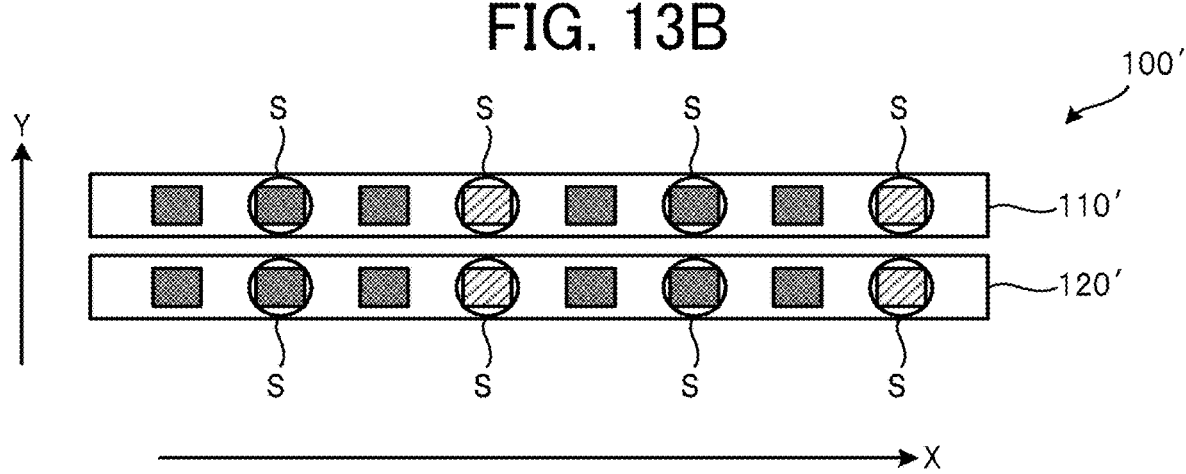
Figure 14A:
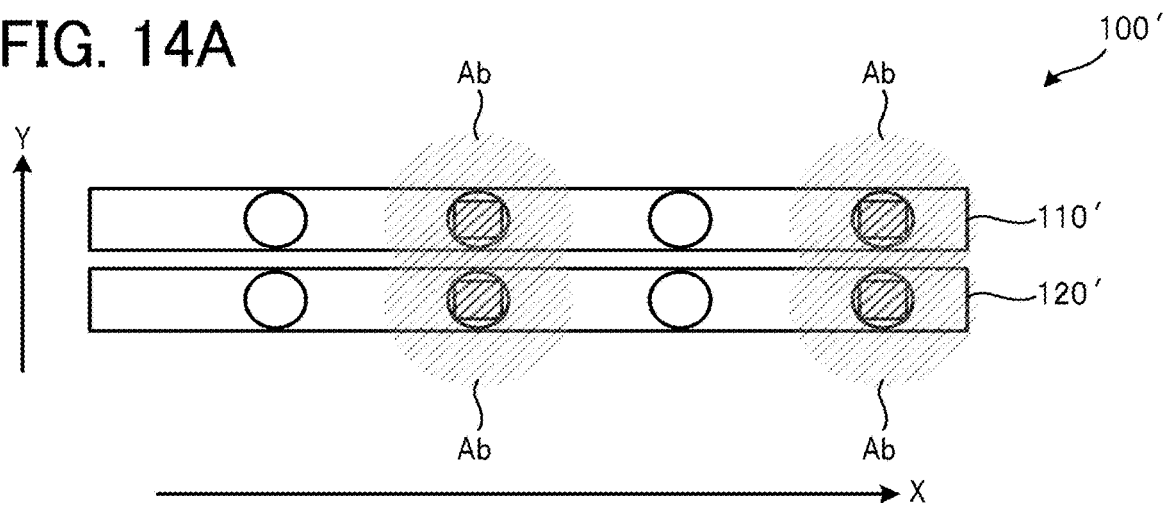
FIG. 14A to FIG. 14C are diagrams illustrating an example of irradiated areas irradiated by the irradiation apparatus illustrated in FIG. 13A and FIG. 13B.
Figure 14B:
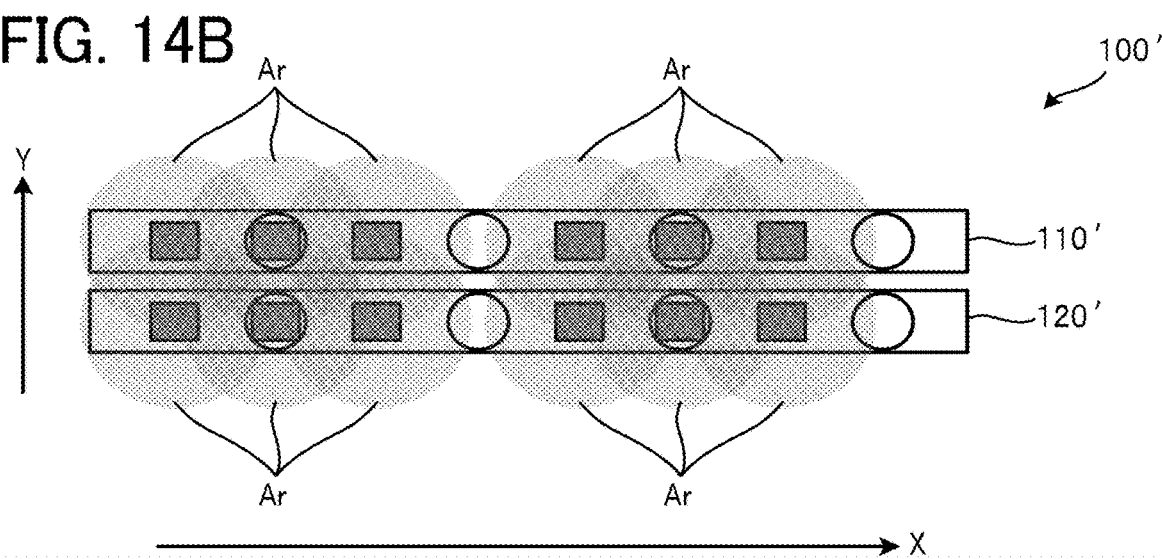
Figure 14C:
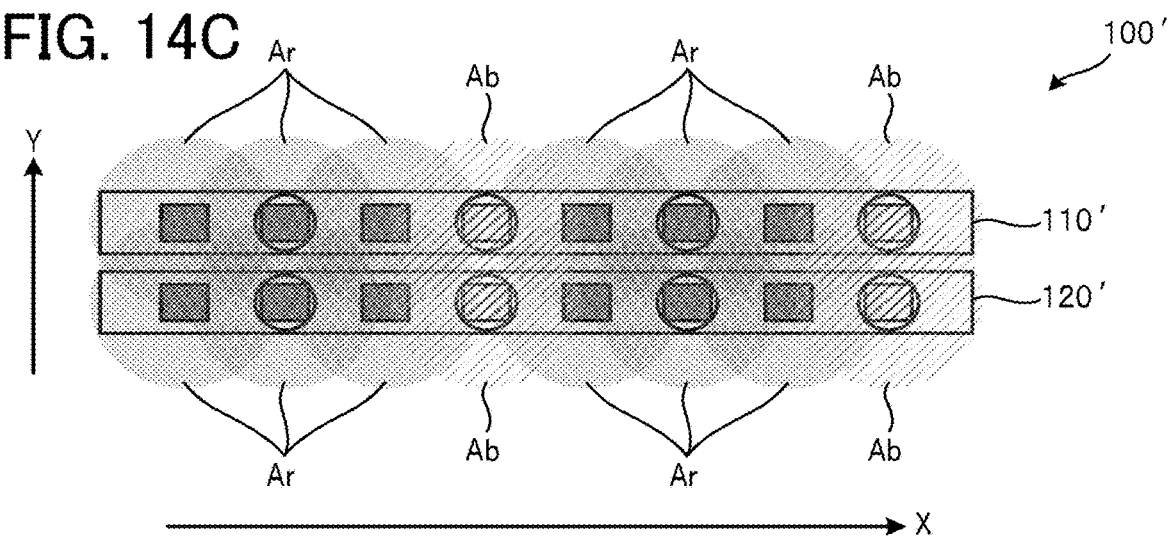

Each of the first light source array 110, the second light source array 120, and the third light source array 130 may have, as a plurality of light sources, white light emitters each including a red wavelength range and a blue wavelength range, and a color adjustment unit such as a color filter. Each of the first light source array 110, the second light source array 120, and the third light source array 130 is often covered with a light-transmissive cover that extends along the X direction to provide protection against water and dust. This cover can include one set of color adjustment units that transmit only light in a red wavelength region and other color adjustment units that transmit only light in the blue wavelength region. The color adjustment units of both types are arranged along the X direction at positions corresponding to the light emitters. Thus, the color of the light emitted from any one of the light emitters is changed by the color adjustment unit that is arranged at the position corresponding to that one of the light emitters. In this case, by arranging the color adjusting units of the different types in a regular pattern along the X direction, light passing through the color adjusting unit has a predetermined hue in the irradiated area. Therefore, in this case, all of the plurality of light emitters can be of the same type. Alternatively, each of the transparent resins 114 illustrated in FIG. 4 can be provided with a color adjustment unit, so that light of different colors is emitted. When the above configuration in which the color In Table 1, Comparative Example 1 represents the result of hydroponic cultivation performed by using a plant irradiation apparatus 100' illustrated in FIG. 13A. Compared to Example 1, the plant irradiation apparatus 100' of Comparative Example 1 includes a first light source array 110' having the same configuration as that of the first light source array 110 in Example 1, and the second light source array 120' having the same color arrangement of light emitters as that of the first light source array 110' in the X direction. In other words, there is no shift in the color of light emitted between the first light source array 110' and the second light source array 120'. FIG. 13B illustrates an example of the arrangement of the plants S in Comparative Example 1. FIG. 14A illustrates irradiated areas Ab(s), when the light emitters 112 and the light emitters 122, each being configured to emit blue light, are turned on. FIG. 14B illustrates irradiated areas Ar(s), when the light emitters 111 and the light emitters 121, each being configured to emit red light, are turned on. FIG. 14C illustrates irradiated areas Ab(s) and Ar(s), when all the light emitters are turned on.

Figure 15:
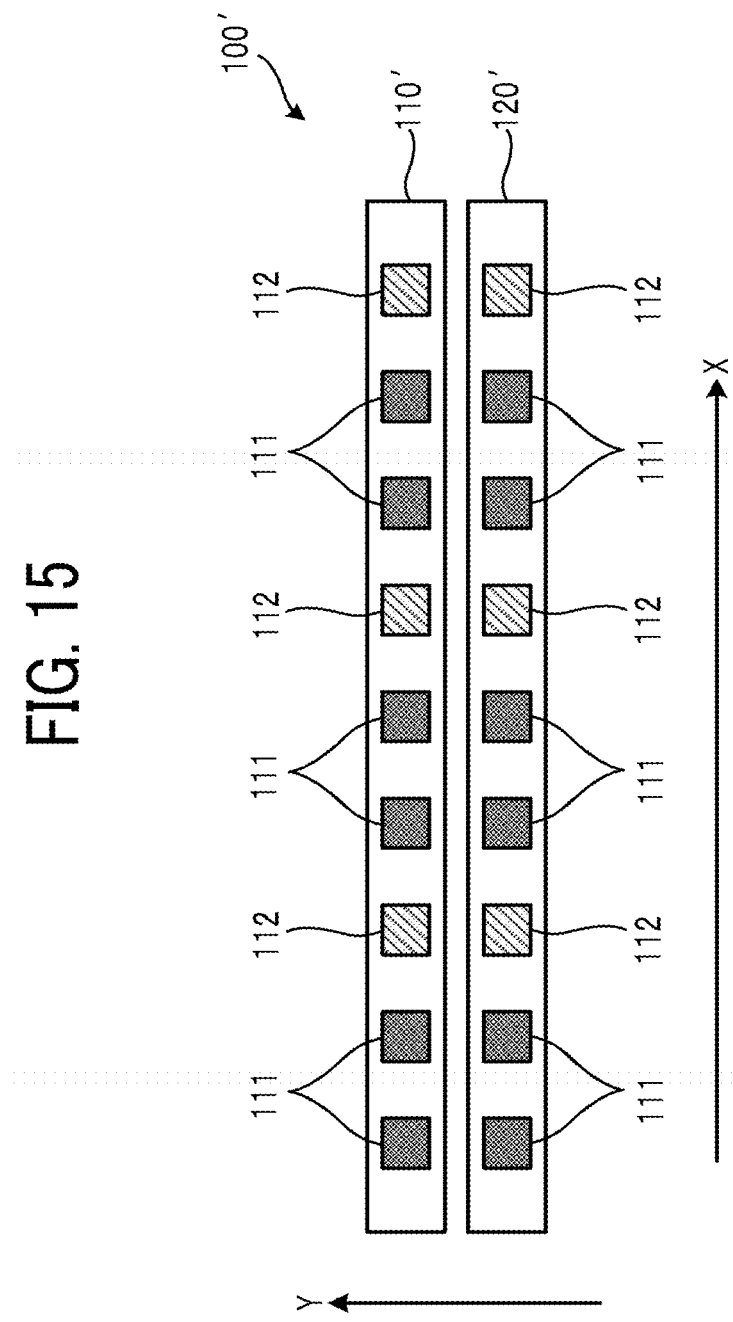
FIG. 15 is a plan view of the irradiation apparatus according to Comparative Example 2.

Comparative Example 2 represents the result of hydroponic cultivation performed by using a plant irradiation apparatuses 100' illustrated in FIG. 15. Compared to Example 2, the plant irradiation apparatus 100' of Comparative Example 2 includes a first light source array 110' having the same configuration as that of the first light source array 110 in Example 2, and the second light source array 120' having the same color arrangement of light emitters as that of the first light source array 110' in the X direction. In other words, there is no shift in the color of light between the first light source array 110' and the second light source array 120'.

Figure 16A:
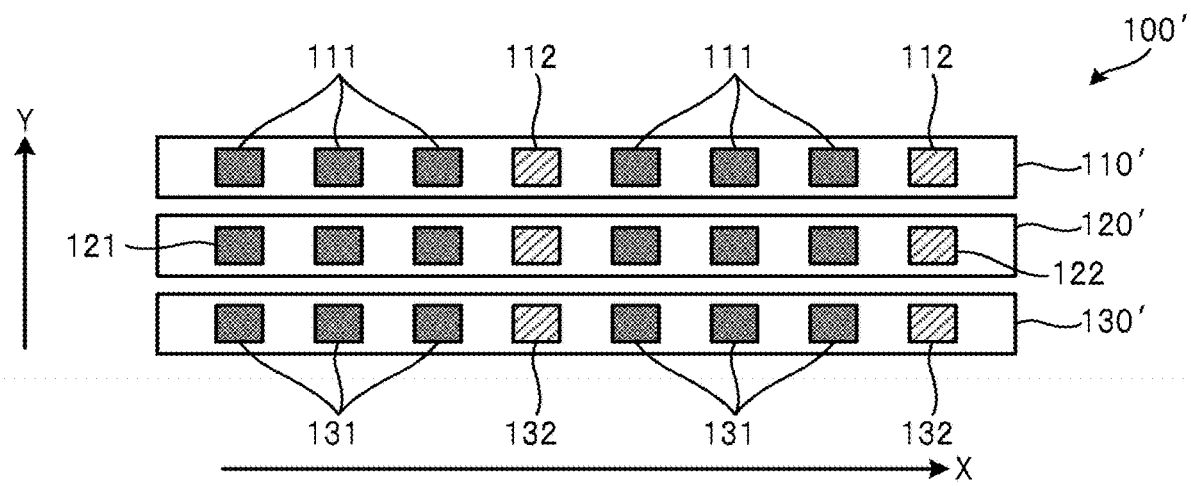
FIG. 16A and FIG. 16B are plan views of the irradiation apparatus according to Comparative Example 3.
Figure 16B:
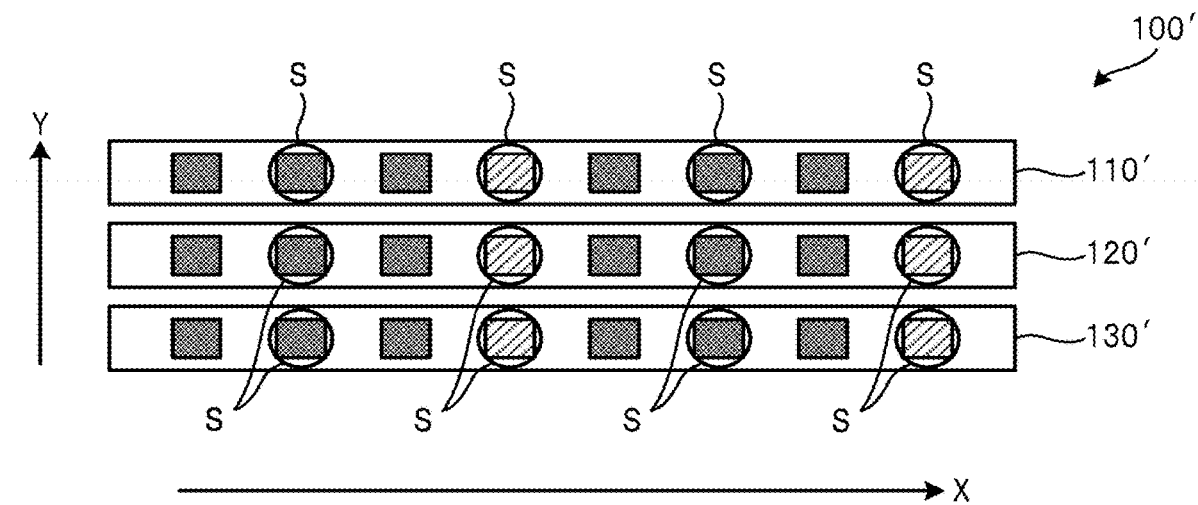
Figure 17A:
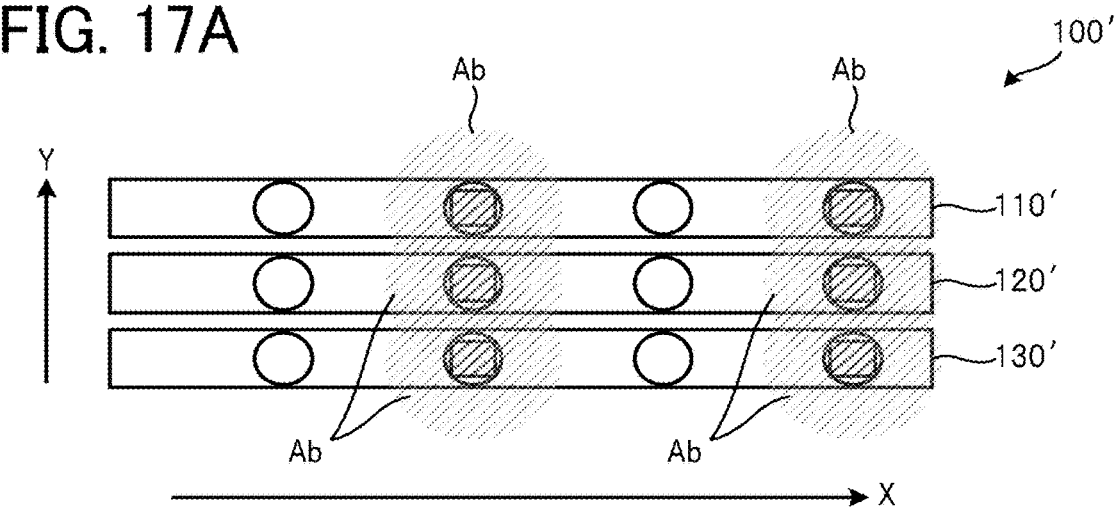
FIG. 17A to FIG. 17C are diagrams illustrating an example of irradiated areas irradiated by the irradiation apparatus illustrated in FIG. 16A and FIG. 16B.
Figure 17B:
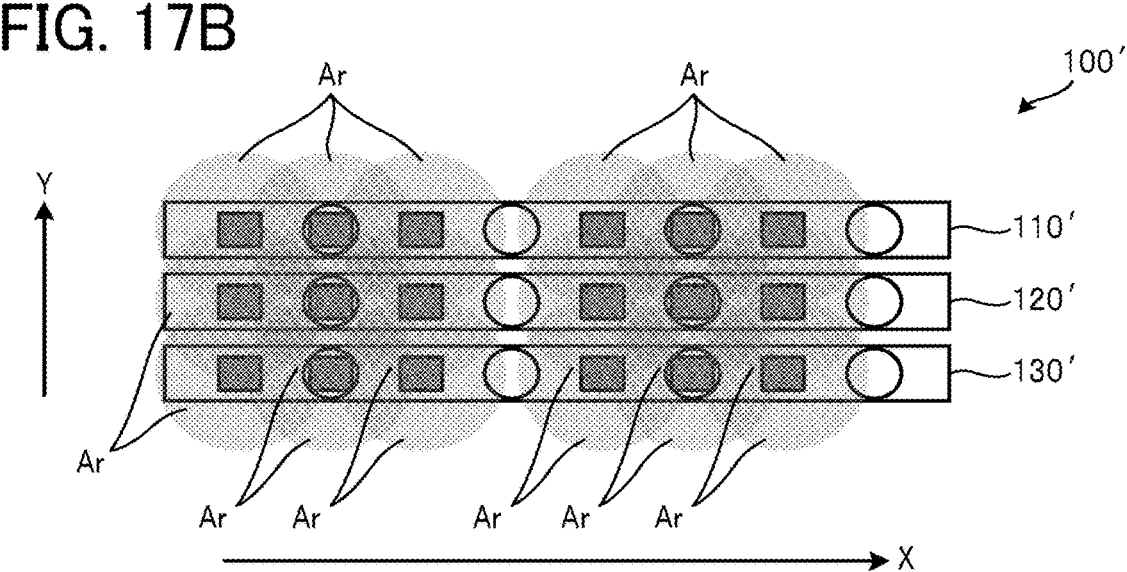
Figure 17C:
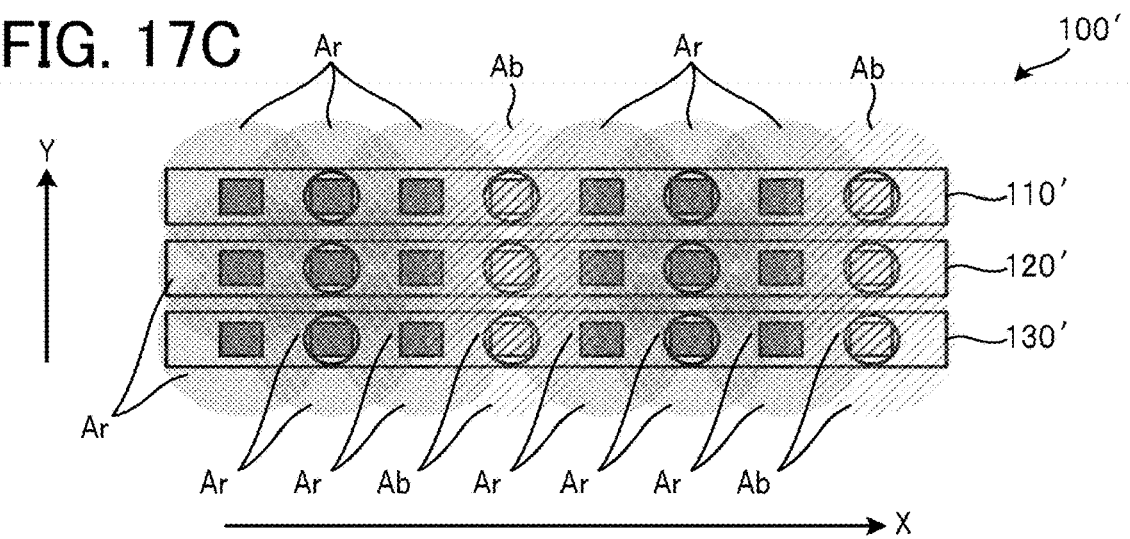

Comparative Example 3 represents the result of hydroponic cultivation performed by using a plant irradiation apparatuses 100' illustrated in FIG. 16A. Compared to Example 3, the plant irradiation apparatus 100' of Comparative Example 3 includes a first light source array 110' having the same configuration as that of the first light source array 110 in Example 3, and third light source array 130' having the same configuration as that of the third light source array 130 in Example 3. The plant irradiation apparatus 100' of Comparative Example 3 further includes a second light source array 120' having the same color arrangement of light emitters as that of each of the first light source array 110' and the third light source array 130' in the X direction. In other words, there is no shift in the color of light emitted between the first light source array 110', the second light source array 120' and the third light source array 130'. FIG. 16B illustrates an example of the arrangement of the plants S in Comparative Example 3. FIG. 17A illustrates irradiated areas Ab(s), when the light emitters 112, the light emitters 122, and the light emitters 132, each being configured to emit blue light, are turned on. FIG. 17B illustrates irradiated areas Ar(s), when the light emitters 111, the light emitters 121, and the light emitters 131, each being configured to emit red light, are turned on. FIG. 17C illustrates irradiated areas Ab(s) and Ar(s), when all the light emitters are turned on.

Comparative Example 4 represents the result of hydroponic cultivation performed by using a plant irradiation apparatuses 100' illustrated in FIG. 18. Compared to Example 4, the plant irradiation apparatus 100' of Comparative Example 4 includes a first light source array 110' having the same configuration as that of the first light source array 110 in Example 4, and third light source array 130' having the same configuration as that of the third light source array 130 in Example 4. The plant irradiation apparatus 100' of Comparative Example 4 further includes a second light source array 120' having the same color arrangement of light emitters as that of each of the first light source array 110' and the third light source array 130' in the X direction. In other words, there is no shift in the color of light emitted among the first light source array 110', the second light source array 120' and the third light source array 130'.

Figure 19A:
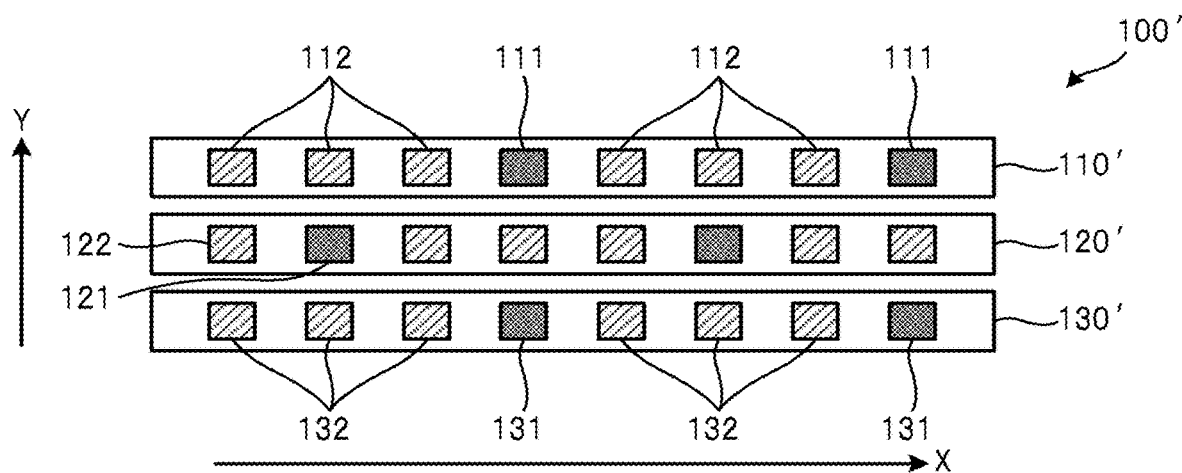
FIG. 19A and FIG. 19B are plan views of the irradiation apparatus according to Comparative Example 5.
Figure 19B:
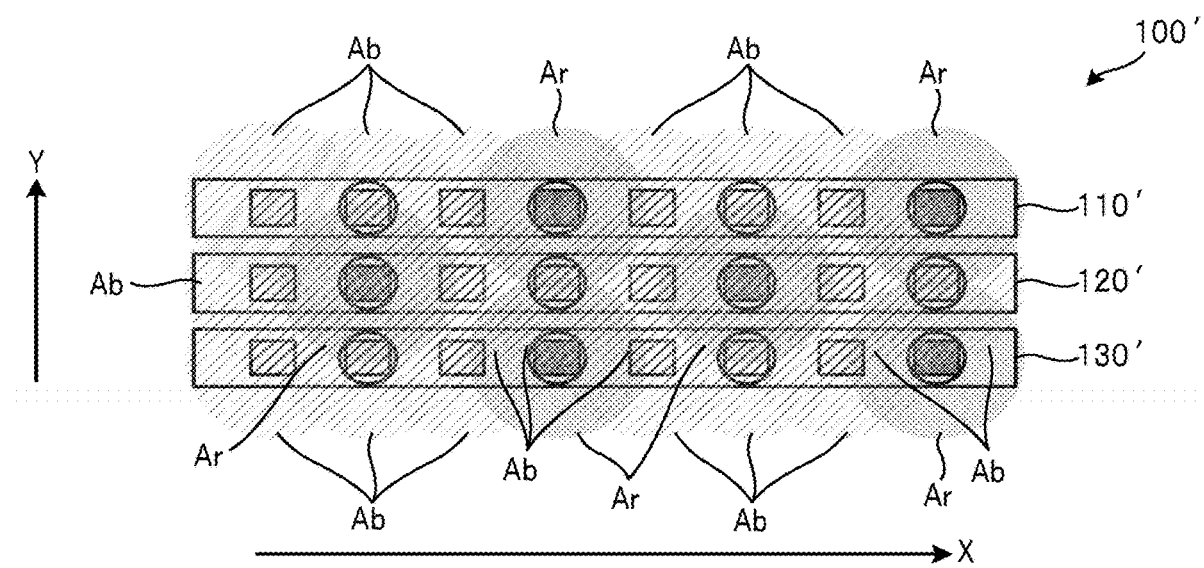

Comparative Example 5 represents the result of hydroponic cultivation performed by using a plant irradiation apparatuses 100' illustrated in FIG. 19A. Compared to Example 3, the plant irradiation apparatus 100' of Example 5 includes a first light source array 110', a second light source array 120', and a third light source array 130', each having the arrangement of colors of light emitters opposite to that of each of the first light source array 110, the second light source array 120, and the third light source array 130 in Example 3. FIG. 19B illustrates irradiated areas Ab(s) and Ar(s), when all the light emitters are turned on in Example 5.

In Table 1, "average photon amount of one vegetable head" indicates the average of values, each obtained by dividing the number of light particles, i.e., the number of photons with which one head of vegetable is irradiated in one second by a light-receiving area of one head of vegetable, when the vegetables are irradiated with light. In Table 1, the average photon amounts of blue light in Comparative Examples 1 to 5 are indicated by $a_1$ to $a_5$, respectively, and the average photon amounts of red light in Comparative Example 1 to 5 are indicated by $c_1$ to $c_5$, respectively, in order to simplify the description. In substantially the same manner, the average photon amounts of blue light in Examples 1 to 4 are indicated by $b_1$ to $b_4$, respectively, and the average photon amounts of red light in Examples 1 to 4 are indicated by $d_1$ to $d_4$, respectively.

The "photon amount variation of one vegetable head" indicates the standard deviation of the photon amount. In Table 1, the photon amount variations of blue light in Comparative Examples 1 to 5 are indicated by $e_1$ to $e_5$, respectively, and the photon amount variations in Comparative Example 1 to 5 are indicated by $g_1$ to $g_5$, respectively, in order to simplify the description. In substantially the same manner, the photon amount variations of blue light in Examples 1 to 4 are indicated by $f_1$ to $f_4$, respectively, and the photon amount variations of red light in Examples 1 to 4 are indicated by $h_1$ to $h_4$, respectively.

In Table 1, the "average weight ratio" in the column of "vegetable" indicates the ratio of the average weight when it is assumed that the average weight of the vegetables in Example 3 is 1. With respect to the "weight variation" in the column "vegetable", "large" indicates that variation in weight of the vegetables is large, and "small" indicates that the variation in the weight of the vegetables are small.

When comparing Comparative Example 1 and Example 1, it is confirmed that the average photon amount of blue light in Comparative Example 1 is smaller than the average photon amount of blue light in Example 1 (i.e., $a_1<b_1$), and the average photon amount of red light in Comparative Example 1 is smaller than the average photon amount of red light in Example 1 (i.e., $c_1<d_1$). Further, it is confirmed that the photon amount variation of blue light in Comparative Example 1 is larger than the photon amount variation of blue light in Example 1 (i.e., $e_1>f_1$), and that the photon amount variation of red light in Comparative Example 1 is larger than the photon amount variation of red light in Example 1 (i.e., $g_1>h_1$). The average weight ratio of vegetables in Comparative Example 1 is 0.78, while the average weight ratio of vegetables in Example 1 is 0.98. Thus, the average weight ratio of vegetables in Example 1 is larger than that of Comparative Example 1. The weight variation of vegetables of Example 1 is smaller than that of Comparative Example 1.

In substantially the same manner, when Comparative Examples 2 to 4 and Examples 2 to 4 are respectively compared, it is confirmed that $a_2<b_2$, $a_3<b_3$ and $a_4<b_4$ were obtained with respect to the average photon amount of blue light, and $c_2<d_2$, $c_3<d_3$, and $c_4<d_4$ were obtained with respect to the average photon amount of red light. Further, it is confirmed that $e_2>f_2$, $e_3>f_3$ and $e_4>f_4$ were obtained with respect to the photon amount variation of blue light, and $g_2>h_2$, $g_3>h_3$, and $g_4>h_4$ were obtained with respect to the photon amount variation of red light. The average weight ratios of vegetables in Examples 2 to 4 are larger than those in Comparative Examples 2 to 4, respectively. The weight variations of vegetables in Examples 2 to 4 are smaller than those in Comparative Example 2 to 4, respectively.

As described above, when Comparative Examples 1 to 4 are compared with Examples 1 to 4, respectively, Examples 1 to 4 have smaller variations in the photon amount with which one head of vegetable is irradiated. In other words, in Examples 1 to 4, the plurality of vegetables are irradiated more evenly with photons, when compared to Comparative Examples 1 to 4. For this reason, the weight variations of vegetables in Examples 1 to 4 are smaller than those in Comparative Examples 1 to 4, respectively. Accordingly, occurrence of the growth difference among a plurality of vegetables is reduced.

Furthermore, as understood from the fact that the average weight ratios of vegetables in Examples 1 to 4 are larger than those in Comparative Examples 1 to 4, this reduction of the growth difference among the plurality of vegetables is implemented while increasing the average weight of vegetables.

When comparing Example 1 and Example 3, the average weight of vegetables in Example 3 is slightly larger than that in Example 1. In other words, when comparing a case where the plant irradiation apparatus 100 includes the third light source array 130 and a case where the plant irradiation apparatus 100 does not include the third light source array 130, a plurality of vegetables are more evenly irradiated with light when the apparatus including the third light source array 130 is used. Accordingly, the plant irradiation apparatus 100 including the third light source array 130 further reduces variations in the growth state of vegetables.

When comparing Example 3 and Example 4, the average weight of vegetables in Example 3 is slightly larger than that in Example 4. This indicates that, when comparing a case where a plurality of light emitters is arranged such that a pattern including three continuous red light emitters alternating with one blue light emitter is repeated as in Example 3 and a case where a plurality of light emitters is arranged such that a pattern including two continuous red light emitters and one blue light emitter is repeated as in Example 4, a larger average weight of vegetables is obtained when a plurality of light emitters is arranged such that a pattern including three continuous red light emitters alternating with one blue light emitter is repeated. It is considered that this is because the proportion of light of the color red, which is a color necessary for photosynthesis by the vegetables, is large.

When comparing Comparative Example 5 and Example 3, it is confirmed that the average photon amount of blue light in Comparative Example 5 is larger than the average photon amount of blue light in Example 3 (i.e., $a_5 > b_3$), and the average photon amount of red light in Comparative Example 5 is smaller than the average photon amount of red light in Example 3 (i.e., $c_5 < d_3$). Further, it is confirmed that the photon amount variation of blue light in Comparative Example 5 is smaller than the photon amount variation of blue light in Example 3 (i.e., $e_5 < f_3$), and that the photon amount variation of red light in Comparative Example 5 is larger than the photon amount variation of red light in Example 3 (i.e., $g_5 > h_3$). The average weight ratio of vegetables in Comparative Example 5 is 0.73, while the average weight ratio of vegetables in Example 3 is 1. Thus, the average weight ratio of vegetables in Example 3 is larger than that of Comparative Example 5. The weight variation of vegetables in Example 5 is smaller than that in Comparative Example 3.

It is considered that since the number of blue light emitters is larger than the number of red light emitters in Comparative Example 5, the average photon amount of blue light in Comparative Example 5 is larger than that in Example 3, and the photon amount variation of blue light in Comparative Example 5 is smaller than that in Example 3. However, the average weight ratio of vegetables in Comparative Example 5 is smaller than that in Example 3, and the weight variation of vegetables in Comparative Example is larger than that in Example 3. This indicates that it is preferable to irradiate vegetables with more red light than blue light for healthy growth of vegetables.

According to one or more embodiments of the present disclosure, a cultivation system is provided that can evenly irradiate a plurality of plants with light, thereby reducing the occurrence of differences in growth rates among the plurality of plants while increasing the average weight of the plants.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

For example, although in the above Examples 1 to 4, a description is given of an example in which the number of red light emitters is larger than the number of blue light emitters, alternatively, the red light emitter and the blue light emitter may be arranged alternately, as illustrated in FIG. 20. Such arrangement is preferable from the viewpoint of increasing the evenness of light with which the plant S are irradiated.

In addition, the number of colors of the light emitter may be three or more. For example, pink light is considered to play a role in promoting the growth of the plant S as red light does. Accordingly, red, pink, and blue light sources may be arranged alternately, such that the ratio of red, pink and blue light is 1:1:1. In addition, when replanting or the like of the plants S is performed, white light may be emitted for worker's convenience. Accordingly, red, blue and white light sources may be arranged alternately, such that the ratio of the red, blue and white light is 1:1:1, for example.

Although most preferable advantages are described above, advantages of the present disclosure are not limited to the advantages described above.

What is claimed is:

1. A cultivation system, comprising:
   a light-emitting apparatus; and
   an installation stand configured to accommodate a plurality of irradiation targets which are to be irradiated with light emitted from the light-emitting apparatus,
   wherein the light-emitting apparatus comprises:
   a first light source array including:
      a plurality of first light sources, each being configured to emit light of a first color; and
      a plurality of second light sources, each being configured to emit light of a second color different from the first color, the plurality of first light sources and the plurality of second light sources being arranged in a specific pattern in a predetermined direction; and
   a second light source array adjacent to the first light source array, the second light source array including:
      a plurality of first light sources, each being configured to emit light of the first color; and
      a plurality of second light sources, each being configured to emit light of the second color different from the first color,
   wherein the plurality of first light sources of the second light source array and the plurality of second light sources of the second light source array are arranged in the specific pattern in the predetermined direction such that an arrangement of colors of the plurality of first light sources and the plurality of second light sources in the second light source array is shifted from an arrangement of colors of the plurality of first light sources and the plurality of second light sources in the first light source array,
   wherein the light-emitting apparatus is configured to irradiate the plurality of irradiation targets arranged along the predetermined direction near each of the first light source array and the second light source array with light emitted from the first light source array and the second light source array, and wherein the installation stand defines a plurality of installation place in which the plurality of irradiation targets are to be accommodated, respectively.

2. The cultivation system of claim 1,
wherein a number of the first light sources is larger than a number of the second light sources.

3. The cultivation system of claim 1, further comprising:
a third light source array provided such that the second light source array is interposed between the first light source array and the third light source array,
wherein the third light source array includes:
a plurality of first light sources, each being configured to emit light of the first color; and
a plurality of second light sources, each being configured to emit light of the second color different from the first color,
wherein the plurality of first light sources of the third light source array and the plurality of second light sources of the third light source array are arranged in the specific pattern in the predetermined direction,
wherein the third light source array has a same arrangement of the plurality of first light sources and the plurality of the second light source in the predetermined direction as the first light source array, and
wherein irradiation targets provided near the second light source array from among the plurality of irradiation targets are irradiated with light emitted from the first light source array, the second light source array and the third light source array.

4. The cultivation system of claim 1,
wherein irradiated areas irradiated with light from arbitrary two light sources that are adjacent with each other in a direction intersecting with the predetermined direction from among the plurality of first light sources and the plurality of second light sources overlap each other in the irradiation target.

5. The cultivation system of claim 1,
wherein the first color is a color necessary for photosynthesis and the second color is a color necessary for photomorphogenesis.

6. The cultivation system of claim 1,
wherein the first color is red and the second color is blue.

7. The cultivation system of claim 1,
wherein the plurality of first light sources and the plurality of second light sources are configured to be detachable from the light-emitting apparatus.

* * * * *